(12) United States Patent
Mitsuoka et al.

(10) Patent No.: US 7,054,239 B1
(45) Date of Patent: May 30, 2006

(54) RECORDING MEDIUM, INFORMATION RECORDING DEVICE, AND INFORMATION REPRODUCING DEVICE

(75) Inventors: Yasuyuki Mitsuoka, Chiba (JP); Norio Chiba, Chiba (JP); Nobuyuki Kasama, Chiba (JP); Manabu Oumi, Chiba (JP); Takashi Niwa, Chiba (JP); Kenji Kato, Chiba (JP); Hidetaka Maeda, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/762,075
(22) PCT Filed: Aug. 4, 1999
(86) PCT No.: PCT/JP99/04248
§ 371 (c)(1),
(2), (4) Date: Mar. 26, 2001
(87) PCT Pub. No.: WO00/08639
PCT Pub. Date: Feb. 17, 2000

(30) Foreign Application Priority Data
Aug. 5, 1998 (JP) .......................................... 10-221933

(51) Int. Cl.
G11B 7/00 (2006.01)

(52) U.S. Cl. ................... 369/44.26; 369/275.4
(58) Field of Classification Search .............. 369/44.26, 369/279.4, 44.13, 44.34, 13.33, 126, 118
See application file for complete search history.

(56) References Cited

U.S. PATENT DOCUMENTS

| | | | | |
|---|---|---|---|---|
| 4,310,916 A | * | 1/1982 | Dil ......................... | 369/275.4 |
| 5,497,359 A | | 3/1996 | Mamin et al. ........... | 369/44.15 |
| 5,533,003 A | * | 7/1996 | Kobayashi ............... | 369/275.4 |
| 5,646,932 A | | 7/1997 | Kuribayashi et al. .... | 369/275.3 |
| 5,724,339 A | * | 3/1998 | Ogawa .................... | 369/275.4 |
| 5,734,632 A | * | 3/1998 | Ito et al. .................... | 369/126 |
| 5,910,940 A | * | 6/1999 | Guerra .................... | 369/275.1 |
| 6,304,527 B1 | * | 10/2001 | Ito et al. .................... | 369/126 |

FOREIGN PATENT DOCUMENTS

| | | |
|---|---|---|
| EP | 0915458 | 5/1999 |
| EP | 1022733 | 7/2000 |
| EP | 1049080 | 11/2000 |
| EP | 1115113 | 7/2001 |

OTHER PUBLICATIONS

Patent Abstracts of Japan, vol. 1997, No. 04, Apr. 30, 1997, publication No. 08321084, publication date Dec. 3, 1996.

Patent Abstracts of Japan, vol. 015, No. 088 (P–1174), Mar. 4, 1991, publication No. 02304737, publication date Dec. 18, 1990.

* cited by examiner

Primary Examiner—Thang V. Tran
(74) Attorney, Agent, or Firm—Adams & Wilks

(57) ABSTRACT

An information recording medium comprises a read-out track having a data region forming data bits for reproduced data and a servo pattern region forming servo bits for tracking control. The servo bits have a first groove that is deep in a direction perpendicular to both a length of the read-out track and a depth of the information recording medium, and a second groove that is deep in a direction opposite to the first groove and having a depth gradually increasing along the read-out track.

13 Claims, 11 Drawing Sheets

RECORDING MEDIUM, INFORMATION RECORDING DEVICE, AND INFORMATION REPRODUCING DEVICE

FIELD OF THE INVENTION

The present invention relates to an information recording medium from which information can be reproduced by the utilization of near-field light, and to an information reproducing apparatus for reproducing information recorded with on the information recording medium. The present invention also relates to an information recording medium and to information reproducing apparatus by which tracking control is made possible.

BACKGROUND OF THE INVENTION

Many of the existing information reproducing apparatuses reproduce information from magnetic disks or optical disks as information recording mediums. In particular, CDs, one of the optical disks, are broadly utilized as media recording a large capacity of information due to the capability of recording information with density and mass production at low cost. The CD has, on its surface, pits formed having a size of nearly a wavelength of the laser light to be used in reproducing and a depth of approximately a quarter of the wavelength, enabling reading out utilizing interference phenomenon of light.

The lens optical systems generally used in the optical microscopes are utilized for reading recorded information out of the optical disks representative of the CDs. Accordingly, where the pit size or track pitch is reduced to increase information recording density, the laser-light spot cannot be reduced in size to a half wavelength or smaller due to the problem with optical diffraction limit, thus running against a wall that the information recording unit is impossible to reduce to a size smaller than the laser-light wavelength.

Meanwhile, without limitation to the optical disks, the magneto-optical disks and DVDs recording information by the magneto-optical recording scheme and phase-shift recording scheme realize recording/reproducing of information with density due to laser-light microscopic spot. Consequently, the information recording density is limited to a spot size obtained by focusing laser light.

In such circumstances, in order to break through such limitation due to diffraction limit, there is a proposal on an information reproducing apparatus using an optical head having a microscopic aperture having a diameter smaller than a wavelength of the laser light utilized in reproducing, e.g. nearly one-tenth thereof, to utilize near-field light (including both near field and far field) produced in the microscopic aperture.

Conventionally, as an apparatus utilizing near-field light, there has been a near-field microscope using a probe having the above microscopic aperture which has been utilized for observing a microscopic surface texture of a sample. As one of the near-field light utilizing schemes in the near-field microscope, there is a scheme (illumination mode) that the probe microscopic aperture and a sample surface are approached in distance to nearly a diameter of the probe microscopic aperture to introduce propagation light through the probe and toward the probe microscopic aperture thereby producing near-field light in the microscopic aperture. In this case, the scattering light caused through interaction between the produced near-field light and the sample surface is detected, involving an intensity and phase reflecting sample-surface fine texture, by a scattering-light detecting system. Thus, observation is made possible with a high resolving power never realized in the convention optical microscopes.

Meanwhile, as another scheme of the near-field microscope utilizing near-field light, there is a scheme (collection mode) that propagation light is illuminated to a sample to localize near-field light on a sample surface so that the probe microscopic aperture is approached to the sample surface to a distance of nearly a diameter of the probe microscopic aperture. In this case, the scattering light caused through interaction between the localized near-field light and the probe microscopic aperture is guided, involving an intensity and phase reflecting sample-surface fine texture, to a scattering-light detecting system through probe microscopic aperture, achieving observation with high resolving power.

The foregoing information reproducing apparatus utilizing near-field light makes use of these observation schemes for the near-field microscopes. By utilizing such near-field light, it is possible to reproduce information from the information recording medium having record with density.

In order to realize reproducing of information recorded with density on an information recording medium by utilizing near-field light mentioned above, a positioning control technology is required to accurately move the probe microscopic aperture as an optical head to an arbitrary position on the information recording medium.

In the magnetic disk : apparatuses, a servo-surface servo scheme and a sector servo scheme are generally adopted for position control. The servo-surface servo scheme is a method that one of a plurality of disk surfaces is used exclusively for servo so that a servo magnetic head is positioned relative to this servo surface and the remaining disk surfaces and magnetic heads are used for data. Also, the sector servo scheme is a method that servo information is embedded here and there on the data surface to use discretely-detected servo information thereby positioning the magnetic head to a data track.

However, it is difficult to apply the positioning control employed for the magnetic disk apparatus to positioning control for reproducing with a high-density information medium due to near-field light. For example, because in the servo-surface servo scheme the servo head and the data head are determined in position accuracy by mechanical accuracy, there is a possibility of causing positional deviation between the both heads due to a difference in temperature distribution, thus making it improper to employ as positioning control to an information recording medium with especial density in the information reproducing apparatus utilizing near-field light.

Meanwhile, the above sector servo scheme is free from occurrence of positional deviation of the head by the difference in temperature distribution as is rendered problematic in the servo-surface servo scheme. However, in a control-system design stage, there is a need to handle as a discrete-value system different from the conventional continuous system. Because the information reproducing apparatus utilizing near-field light requires accurate positioning to an especially dense information recording medium, devising is needed for using such a complicated control system.

On the other hand, the optical disk apparatus employs a positioning control method, particularly as tracking error detecting method, a three-beam method, a push-pull method, a pre-wobbling tracking error detecting method. The three-beam method is a method that the beam from a laser diode is divided by a diffraction grating into totally three beams of 0-order light (main beam) for recording and reproducing, ±1-order light (sub-beams) of two in number and two sub-beams are slightly deviated from a center of a guide groove provided on an optical disk so that reflection light from the both is received by two light-receiving surfaces of a photo-detector to provide a differential signal thereof for controlling the objective lens.

Also, the push-pull method is a method that the reflection light of a beam illuminated to a guide groove provided on an optical disk is detected in a two-division detector to thereby obtain a differential signal as a tracking error signal for controlling the objective lens. The pre-wobbling tracking error detecting method is a method that elongate pits (wobbling marks) A and B, each set thereof comprising two, are arranged relative to a center of the track radially of the disk with slight deviation relative to a center of the track so that, when the light spot traces a center of the track, a change in the amount of the reflection light from the pits A and B is caused as a tracking error signal to control the objective lens.

The above-explained tracking error detection methods for the optical disk apparatus in any thereof are the methods wherein the illumination light to the pits formed on the disk and the reflection light reflected by them are both handled as propagation light (far field). Devising has been required where applied for detecting non-propagation light (near field) such as near-field light or reflection scattering light thereof. In particular, in the information recording medium that reproduction is possible with utilization of near-field light, information recording unit could have been determined by a difference in optical property besides concave-convex information such as pits formed on the conventional optical disk. There has been a desire for optical-head positioning control for reproducing from such an information recording medium, particularly an information reproducing apparatus for performing tracking.

It is an object of the present invention to provide, in view of the above problems, an information recording medium and information reproducing apparatus for reproducing information with reliability for an information recording medium having dense record, particularly realizing tracking by a simple structure.

SUMMARY OF THE INVENTION

In order to achieve the above object, a first information recording medium of the present invention is, in an information recording medium forming, on a medium surface, information to be reproduced by a reproducing probe having a microscopic aperture for producing near-field light, characterized in that: a reproduced-data zone recording reproduced data and a servo pattern zone recording servo data for tracking control are provided on a read-out track to be read by the reproducing probe; as the servo data being arranged alternately a first groove formed having a depth increased constantly or gradually in one direction perpendicular to both a direction of the read-out track and a direction of a depth of the medium and a second groove formed having a depth increased constantly or gradually in the other direction perpendicular to both the direction of the read-out track and the direction of the depth of the medium, on the read-out track in the servo pattern zone.

According to this invention, prepared as the servo data for tracking control are a first groove formed having, a depth increased constantly or gradually in one direction perpendicular to both a direction of the read-out track and a direction of a depth of the medium and a second groove made reverse in depth increase direction to the first groove, which are alternately arranged on the read-out track in the servo pattern zone. Accordingly, where near-field light is introduced to the read-out track of the servo data in a position deviated from a center thereof, it is possible to obtain reflection scattering light with repeating high and low intensities. This can be utilized as a signal for tracking control.

Also, a second information recording medium of the present invention is characterized, in the first information recording medium, in that the first groove and second groove are triangular in section taken in the direction perpendicular to the read-out track.

According to this invention, because the section of the servo data in a direction perpendicular to the read-out direction is made in a triangular form, it is possible to provide a smooth and slant surface for the servo data. Where introducing near-field light, it is possible to obtain reflection scattering light finely varying in the depth direction.

Also, a third information recording medium of the present invention is characterized, in the first information recording medium, in that the first groove and second groove are stepwise in section taken in the direction perpendicular to the read-out track.

According to this invention, because the section of the servo data in a direction perpendicular to the read-out direction is made in a stepwise form, it is possible to obtain reflection scattering light varying stepwise where near-field light is introduced to the servo data in each position in a direction away from a center thereof.

Also, a fourth information recording medium of the present invention is, in an information recording medium forming, on a medium surface, information to be reproduced by a reproducing probe having a microscopic aperture for producing near-field light, characterized in that: a reproduced-data zone recording reproduced data and a servo pattern zone recording servo data for tracking control are provided on a read-out track to be read by the reproducing probe; as the servo data being arranged alternately a first groove formed having an interval in a direction of the read-out track increased constantly or gradually in one direction perpendicular to both the direction of the read-out track and a direction of a depth of the medium and a second groove formed having an interval in the direction of the read-out track increased constantly or gradually in the other direction perpendicular to both the direction of the read-out track and the direction of the depth of the medium, on the read-out track in the servo pattern zone.

According to this invention, prepared as the servo data for tracking control are a first groove formed having an interval increased constantly or gradually in one direction perpendicular to both a direction of the read-out track and a direction of a depth of the medium and a second groove made reverse in interval increase direction to the first groove, which are alternately arranged on the read-out track in the servo pattern zone. Accordingly, where near-field light is introduced to the read-out track of the servo data in a position deviated from a center thereof, it is possible to obtain reflection scattering light with repeating high and low intensities. This can be utilized as a signal for tracking.

Also, a fifth information recording medium of the present invention is, in an information recording medium forming, on a medium surface, information to be reproduced by a reproducing probe having a microscopic aperture for producing near-field light, the information recording medium, characterized in that: a unit of the information comprises a groove formed having a depth constantly or gradually increased in one direction perpendicular to both a direction of a read-out track to be read by the reproducing probe and a direction of a depth of the medium.

According to this invention, a unit of the information is constituted by a groove formed having a depth constantly or gradually increased in one direction perpendicular to both a direction of a read-out track to be read by the reproducing probe and a direction of a depth of the medium. Accordingly, when reading out the information, where near-field light is introduced from a center of this read-out track to each position perpendicular to the read-out track and in a plane direction of the medium, it is possible to obtain reflection scattering light different in intensity. This can be utilized as a signal for tracking.

Also, a sixth information recording medium of the present invention is, in an information recording medium forming, on a medium surface, information to be reproduced by a reproducing probe having a microscopic aperture for producing near-field light, the information recording medium characterized in that: a section taken in a direction perpendicular to a read-out direction to be read by the reproducing probe is formed in the form of saw tooth, the information being formed along a slant surface constituting the saw tooth.

According to this invention, a section taken in a direction perpendicular to a read-out direction to be read by the reproducing probe is formed in the form of saw tooth, and each slant surface constituting the saw tooth is formed with the information as a read-out track. Accordingly, when reading out the information, where near-field light is introduced from a center of this read-out track to each position perpendicular to the read-out track and in a plane direction of the medium, it is possible to obtain reflection scattering light different in intensity. This can be utilized as a signal for tracking.

Also, a first information reproducing apparatus of the present invention is, in an information reproducing apparatus for reproducing information by a reproducing probe having a microscopic aperture for producing near-field light, characterized by comprising: an information recording medium having on a read-out track to be read by the reproducing probe a reproduced-data zone recording reproduced data and a servo pattern zone recording servo data for tracking control, the servo data being arranged with a constant deviation alternately left and right with respect to a center axis of the read-out track; photo-detecting means for detecting reflection scattering light caused due to scattering of the near-field light by the servo data and outputting a detection signal; comparison operating means for comparing between a detection signal outputted from the photo-detecting means and a synchronization signal determined based on an interval of the servo data and generating and outputting a differential signal; and reproducing-probe-position control means for controlling a position of the reproducing probe according to the differential signal.

According to this invention, an information recording medium is provided with a reproduced-data zone recording reproduced data and a servo pattern zone recording servo data for tracking control. The servo data is arranged with a constant deviation alternately left and right with respect to a center axis of the read-out track. By making incident the near-field light produced in the microscopic aperture of the reproducing probe on the servo pattern zone, it is possible to obtain a tracking signal having a waveform different depending on a deviation from a center axis of the read-out track. Because the reproducing probe is controlled in position according to the tracking detection signal, accurate tracking control utilizing near-field light is made possible.

Also, a second information reproducing apparatus of the present invention is, in an information reproducing apparatus for reproducing information by a reproducing probe having a microscopic aperture for producing near-field light, characterized by comprising: an information recording medium having on a read-out track to be read by the reproducing probe a reproduced-data zone recording reproduced data and a servo pattern zone recording servo data for tracking control, as the servo data being arranged alternately a first groove formed having a depth increased constantly or gradually in one direction perpendicular to both a direction of the read-out track and a direction of a depth of the medium and a second groove formed having a depth increased constantly or gradually in the other direction perpendicular to both the direction of the read-out track and the direction of the depth of the medium, on the read-out track in the servo pattern zone; photo-detecting means for detecting reflection scattering light caused due to scattering of the near-field light by the servo data and outputting a detection signal; comparison operating means for comparing between a detection signal outputted from the photo-detecting means and a synchronization signal determined based on an interval of the servo data and generating and outputting a differential signal; and reproducing-probe-position control means for controlling a position of the reproducing probe according to the differential signal.

According to this invention, an information recording medium is provided with a reproduced-data zone recording reproduced data and a servo pattern zone recording servo data for tracking control. Prepared as the servo data are a first groove formed having a depth increased constantly or gradually in one direction perpendicular to both a direction of the read-out track and a direction of a depth of the medium and a second groove formed reverse in depth increasing direction to the first groove, which are alternately arranged on the read-out track in the servo pattern zone. By making incident the near-field light produced in the microscopic aperture of the reproducing probe on the servo pattern zone, it is possible to obtain a tracking signal having a different waveform due to a deviation from a center axis of the read-out track. Because the reproducing probe is controlled in position according to the tracking detection signal, accurate tracking control utilizing near-field light is made possible.

Also, a third information reproducing apparatus of the present invention is, in an information reproducing apparatus for reproducing information by a reproducing probe having a microscopic aperture for producing near-field light, characterized by comprising: an information recording medium having on a read-out track to be read by the reproducing probe a reproduced-data zone recording reproduced data and a servo pattern zone recording servo data for tracking control, as the servo data being arranged alternately a first groove formed having an interval in a direction of the read-out track increased constantly or gradually in one direction perpendicular to both the direction of the read-out track and a direction of a depth of the medium and a second groove formed having an interval in the direction of the read-out track increased constantly or gradually in the other direction perpendicular to both the direction of the read-out track and the direction of the depth of the medium, on the read-out track in the servo pattern zone; photo-detecting means for detecting reflection scattering light caused due to scattering of the near-field light by the servo data and outputting a detection signal; comparison operating means for comparing between a detection signal outputted from the photo-detecting means and a synchronization signal determined based on an interval of the servo data and generating and outputting a differential signal; and reproducing-probe-position control means for controlling a position of the reproducing probe according to the differential signal.

According to this invention, an information recording medium is provided with a reproduced-data zone recording reproduced data and a servo pattern zone recording servo data for tracking control. Prepared as the servo data are a first groove formed having an interval in a direction of the read-out track increased constantly or gradually in one direction perpendicular to both the direction of the read-out track and a direction of a depth of the medium and a second groove formed having an interval in the direction of the read-out track increased constantly or gradually in the other direction perpendicular to both the direction of the read-out track and the direction of the depth of the medium. These are alternately arranged on the read-out track in the servo pattern zone. By making incident the near-field light produced in the microscopic aperture of the reproducing probe on the servo pattern zone, it is possible to obtain a tracking detection signal having a waveform different depending on a deviation from a center axis of the read-out track. Because the reproducing probe is controlled in position according to the tracking detection signal, accurate tracking control utilizing near-field light is made possible.

Also, a fourth information reproducing apparatus of the present invention is, in an information reproducing apparatus for reproducing information by a reproducing probe having a microscopic aperture for producing near-field light, characterized by comprising: an information recording medium forming a unit of the information as a groove formed having a depth constantly or gradually increased in one direction perpendicular to both a direction of a read-out track to be read by the reproducing probe and a direction of a depth of the medium; photo-detecting means for detecting reflection scattering light caused due to scattering of the near-field light by the servo data and outputting a detection signal; and reproducing-probe-position control means for controlling a position of the reproducing probe according to the differential signal.

According to this invention, an information recording medium forms, as a unit of the information, a groove formed having a depth constantly or gradually increased in one direction perpendicular to both a direction of a read-out track to be read by the reproducing probe and a direction of a depth of the medium. Accordingly, when reading out the information, the intensity of the near-field light interacting with this information, i.e. a tracking detection signal detected in the photo-detector, varies in a position deviated from a center axis of the read-out track. Consequently, it is possible to control a position of the reproducing probe according to an intensity of the tracking detection signal and performing accurate tracking control utilizing near-field light.

Also, a fifth information reproducing apparatus of the present invention is, in an information reproducing apparatus for reproducing information by a reproducing probe having a microscopic aperture for producing near-field light, characterized by comprising: an information recording medium in which a section taken in a direction perpendicular to a read-out direction to be read by the reproducing probe is formed in, the form of saw tooth, the information being formed along a slant surface constituting the saw tooth; photo-detecting means for detecting reflection scattering light caused due to scattering of the near-field light by the servo data and outputting a detection signal; and reproducing-probe-position control means for controlling a position of the reproducing probe according to the intensity of the detection signal.

According to this invention, an information recording medium is formed with a section taken in a direction perpendicular to a read-out direction to be read by the reproducing probe is formed-in the form of saw tooth. The information along a slant surface as a read-out track constituting the saw tooth. Accordingly, when reading out the information, the intensity of the near-field light interacting with this information, i.e. a tracking detection signal detected in the photo-detector, varies in a position deviated from a center axis of the read-out track. Consequently, it is possible to control a position of the reproducing probe according to an intensity of the tracking detection signal and performing accurate tracking control utilizing near-field light.

Also, a sixth information reproducing apparatus of the present invention is, in an information reproducing apparatus for reproducing information by a reproducing probe having a microscopic aperture for producing near-field light, characterized by comprising: an information recording medium forming the information on a read-out track to be read by the reproducing probe; a reproducing probe having microscopic apertures formed having an interval in a direction of the read-out track increased constantly or gradually in one direction perpendicular to both a direction of the read-out track and a direction of a depth of the medium; photo-detecting means for detecting reflection scattering light caused due to scattering of the near-field light by the information and outputting a detection signal; and reproducing-probe-position control means for controlling a position of the reproducing probe according to an intensity of the refection scattering signal.

According to this invention, a reproducing probe has microscopic apertures made in a form having an interval in a direction of the read-out track increased constantly in a direction of the read-out track. Accordingly, the intensity of the near-field light interacting with the information formed on the information recording medium, i.e. a tracking detection signal detected in the photo-detector, varies in a position deviated from a center axis of the read-out track. Consequently, it is possible to control a position of the reproducing probe according to an intensity of the tracking detection signal and performing accurate tracking control utilizing near-field light.

DETAILED DESCRIPTION OF THE PREFERRED EMBODIMENTS

Embodiments of information recording mediums and information reproducing apparatuses according to the present invention will be explained in detail below based on the drawings.

(Embodiment 1)

Figure 1:
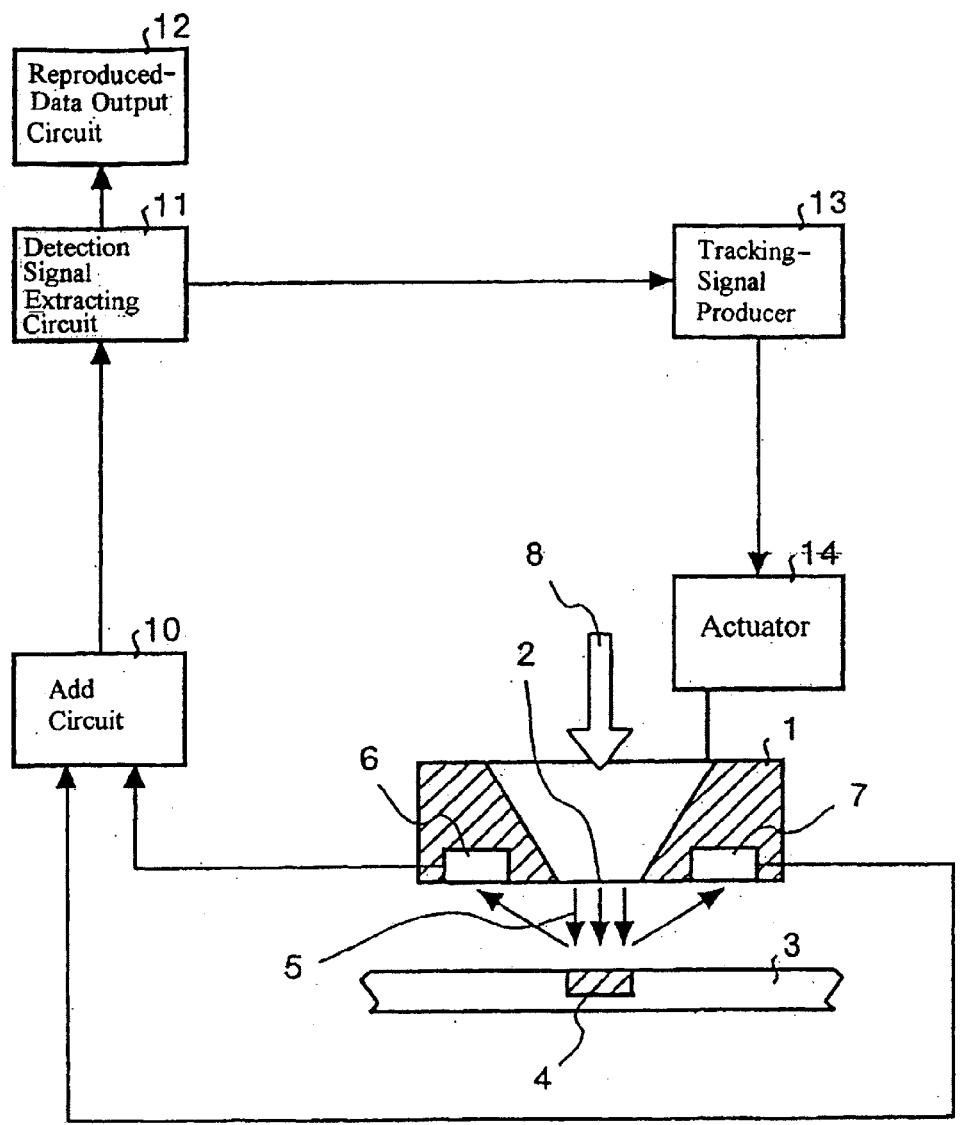
FIG. 1 is a block diagram showing a schematic structure of an information reproducing apparatus according to the present invention.

FIG. 1 is a block diagram showing a schematic structure of an information reproducing apparatus according to Embodiment 1 of the present invention. In FIG. 1, the information reproducing apparatus according to Embodiment 1 is structured by a reproducing probe 1 for reproducing near-field light, an information recording medium 3 forming recorded bits (including both data bit for reproducing data and servo bits for tracking control) with density, photo-detectors 6 and 7 for receiving the reflected scattering light scattered by the recorded bits 4 on the information recording medium 3 and outputting electric signals, an add circuit 10 for amplifying each electric signal outputted from the photo-detectors 6 and 7 to perform add operation and outputting addition signals, a detection-signal extracting circuit 11 for extracting a reproduced signal and a tracking detection signal related to tracking control from the addition signal outputted from the add circuit 10 and outputting them, a reproduced-data output circuit 12 for acquiring and outputting reproduced data outputted from the detection-signal extracting circuit 11, a tracking-signal producer 13 for producing and outputting a tracking signal from a tracking detection signal outputted from the detection-signal extracting circuit 11, and an actuator 14 for controlling the position of the reproducing probe in accordance with a tracking signal outputted from the tracking-signal producer 13.

In the reproducing probe 1, a microscopic aperture 2 is formed having a diameter in a size smaller than a wavelength of the laser light 8 introduced from a laser light source (not shown), e.g. several tenth of nano-meters. Near-field light 5 is produced in the microscopic aperture 2 by introducing the laser light 8. In FIG. 1, as a reproducing probe 1 is shown a planar probe having photo-detectors 6 and 7 provided in a planar substrate forming an inverted conical or pyramidal penetration hole to provide a microscopic aperture 2 in an apex thereof. However, a probe used in the usual near-field microscope can be utilized in place thereof. For example, it is possible to utilize an probe capable of producing near-field light in an illumination mode as described before, including an optical fiber probe comprising an optical fiber having a microscopic aperture at a tip and coated with metal over a surface and a cantilever-type optical probe having at a tip a microscopic aperture to guide laser light through an optical waveguide. However, in this case, there is a need to independently arrange the photo-detector together with an optical lens system in the vicinity of the probe.

The near-field light 5 produced in the microscopic aperture 2 of the reproducing probe 1 is scattered by the recorded bits 4 formed on the information recording medium 3, whose scatter light turns into propagation light (hereinafter, referred to as reflection scatter light) and introduced to the photo-detectors 6 and 7. Herein, the planar probe as shown in FIG. 1 is fabricated by a silicon process as used in the conventional semiconductor producing technology. The photo-detectors 6 and 7 are photo-diodes integrated on a silicon wafer. Meanwhile, where the photo-detectors 6 and 7 are independently arranged as described above, the photo-detectors 6 and 7 are photo-diodes, photo-electronic multiplying tubes or the like.

Figure 2:
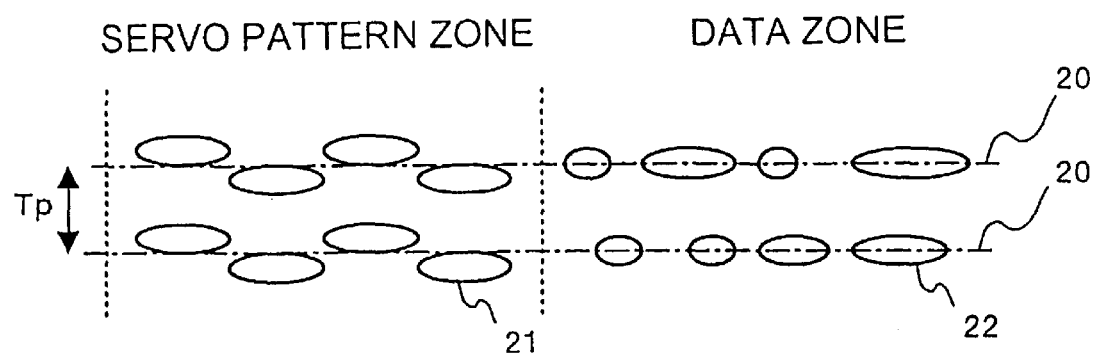
FIG. 2 is a figure showing the recorded bits of an information recording medium according to Embodiment 1.

FIG. 2 is a figure showing recorded bits on the information recording medium 3 to be reproduced in the information reproducing apparatus according to Embodiment 1. In FIG. 2, the information recording medium 3 is provided, on a track to be read out by the reproducing probe 1, with a data region forming data bits for reproduced data and a servo-pattern region forming servo bits for tracking control. In the data region, the data bits 22 are arranged in a predetermined information pattern such that a center axis thereof coincides with a center axis 20 of the read-out track. On the other hand, in the servo pattern region, the servo bits 21 are formed alternately left and right with respect to the center axis 20 of the read-out track. In this manner, the information recording medium 3 adopts the foregoing sector servo scheme and form servo bits 21 serving a pre-wobbling mark as servo information thereof. Note that, in this information recording medium 3, there is a need to provide comparatively large a spacing Tp between the read-out tracks because the servo bits are arranged alternately left and right with respect to the center axis 20 of the read-out track.

The operation of the information reproducing apparatus according to Embodiment 1 will be explained below on the assumption that the recorded bits are read out by the reproducing probe 1 by making the information recording medium 3 in a disk form and rotating it at its center by a rotary mechanism (not shown). First, in the case that reading out is made in a state the microscopic aperture 2 of the reproducing probe 1 at a center is along the center axis 20 of the read-out track on the information recording medium 3, i.e. where the center axis 20 of the read-out track is positioned on an area that the near-field light 5 produced in the microscopic aperture 2 is maximum in intensity, the reflection scatter light of the near-field light 5 obtained due to scatter by the data bits 22 in the data region exhibits sufficiently high intensity. Accordingly, it is possible to obtain reliable reproduced signals in accordance with the recording pattern of the data bits 22 through the photo-detectors 6 and 7.

On the other hand, the reflection scatter light of the near-field light 5 obtained due to scatter by the servo bits 21 in the servo pattern region also outputs a tracking detection signal in accordance with the record pattern of the servo bits 21 through the photo-detectors 6 and 7. Herein, the record pattern of the servo bits 21 is formed at a certain constant interval throughout the entire read-out track in the servo pattern region. Consequently, when the reproducing probe 1 passes the servo pattern region, a tracking detection signal is outputted with a period determined by a reading rate (rotation velocity of the information recording medium 3) from the photo-detectors 6 and 7. In particular, because the servo bits 21 are arranged, with even deviation, alternately left and right with respect to the center axis 20 of the track, where reading out is made in a state the center of the microscopic aperture 2 of the reproducing probe 1 is along the center axis 20 of the read-out track on the information recording medium 3, the intensity of a tracking detection signal to be obtained on each servo bit is equal.

Next, in the case that reading out is made in a state the microscopic aperture 2 of the reproducing probe 1 at a center is deviated off the center axis 20 of the read-out track on the information recording medium 3, i.e. where the center axis 20 of the read-out track is positioned deviated off an area that the near-field light 5 produced in the microscopic aperture 2 is maximum in intensity, the reflection scatter light of the near-field light 5 obtained due to scatter by the data bits 22 in the data region does not exhibit sufficiently high intensity. Accordingly, in order to obtain a reproduced signal that the information pattern of the data bits 22 is positively reproduced through photo-detectors 6 and 7, there is a need of tracking control to move the reproducing probe 1 to the center axis 20 of the read-out track.

On the other hand, the tracking detection signal obtained for the servo bit 21 deviated toward off the reproducing probe 1 exhibits high intensity while the tracking detection signal for the servo bit 21 positioned deviated in the reverse direction exhibits low intensity. Accordingly, when the reproducing probe 1 passes the servo pattern region, outputted is a tracking detection signal having a waveform alternately repeating high and low intensities.

Herein, the electric signal (reproduced signal and tracking detection signal) outputted from the photo-detectors 6 and 7 is subjected at all times to amplification and add operation in the add circuit 10 and outputted as an add signal to the detection-signal extracting circuit 11. In the detection-signal extracting circuit 11, determination is made as to whether the reproducing probe at present is passing the data region or the servo pattern region, by the use of a synchronization signal with a period determined by a reading rate (rotation velocity of the information recording medium 3). In the case that the reproducing probe 1 is passing the data region, the add signal outputted from the add circuit 10 is inputted as a reproduced signal to the reproduced-data output circuit 12. Where the reproducing probe 1 is passing the servo pattern region, the add signal outputted from the add circuit 10 is inputted as a tracking detection signal to the tracking signal producer 13.

As described above, where reading out is made in the state that the center of the microscopic aperture 2 of the reproducing probe 1 is off the center axis 20 of the read-out track of the information recording medium 3 and a tracking signal having a waveform alternately repeating high and low intensities is inputted to the tracking signal producer 13, the tracking signal reproducer 13 first compares the waveform represented by the tracking detection signal, particularly the magnitude of signals for the beginning two servo bits in the servo pattern region. Depending on the relationship in magnitude, it is determined whether the reproducing probe 1 at present is deviated toward an inner peripheral side or an outer peripheral side of the information recording medium 3. Further, by operating an intensity difference between the signals, a tracking signal is produced that represents a moving direction and moving amount of the reproducing probe 1. This tracking signal is outputted to the actuator 14. In the actuator 14, the reproducing probe is moved depending on the tracking signal outputted from the tracking signal reproducer 13, thereby achieving tracking control.

As explained above, according to the information recording medium according to Embodiment 1, on the read-out track are provided a data region forming data bits for reproduction data and a servo pattern region forming servo bits for tracking control. Furthermore, the servo bits in the servo pattern region are arranged with alternate deviations of left and right from the center axis of the read-out track. Accordingly, it is possible to provide a tracking detection signal for tracking control. Also, according to the information recording apparatus according to Embodiment 1, in the servo pattern region of the information recording medium, a tracking detection signal can be obtained that has a waveform different depending upon a deviation of the center axis of the read-out track. From a waveform pattern of this tracking detection signal, tracking control can be made for the reproducing probe. Also, because the near-field light produced in the microscopic aperture of the reproducing probe is utilized as a signal for tracking control, accurate tracking control is achieved with high positional resolving power. Furthermore, because the optical system used for reproduced-signal detection and tracking-signal detection is integrated without separation, the apparatus structure can be simplified.

(Embodiment 2)

Next, explained is an information reproducing apparatus according to Embodiment 2. Because the schematic structure of the information reproducing apparatus according to Embodiment 2 is similar to FIG. 1 explained in Embodiment 1, the explanation thereof is herein omitted. The difference of the information reproducing apparatus according to Embodiment 2 from Embodiment 2 lies in that the servo bits formed in a servo pattern region on the information recording medium 3 are arranged in series on a center axis of a read-out track and the form of the servo bit is not symmetric left and right about the center line of the read-out track.

Figure 3:
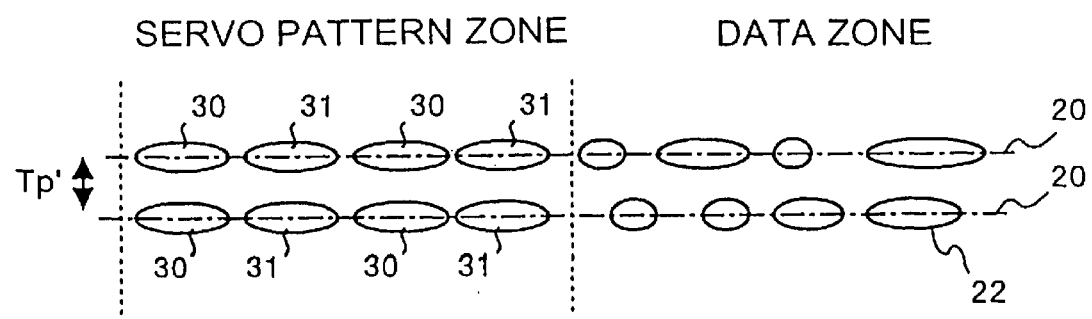
FIG. 3 is a figure showing the recorded bits of an information recording medium according to Embodiment 2.

FIG. 3 is a figure showing recorded bits on the information recording medium 3 to be reproduced in the information reproducing apparatus according to Embodiment 2. In FIG. 3, the information recording medium 3 is provided, on a track to be read out, with a data region forming data bits for reproduced data and a servo-pattern region forming servo bits for tracking control. In the data region, the data bits 22 are arranged in a predetermined information pattern such that a center axis thereof coincides with a center axis 20 of the read-out track of the reproducing probe 1. On the other hand, in the servo pattern region, the servo bits 30 and 31 are formed at a constant interval such that the center axis thereof coincides with the center axis 20 of the read-out track of the reproducing probe 1, similarly to the data bits 22.

Figure 4:
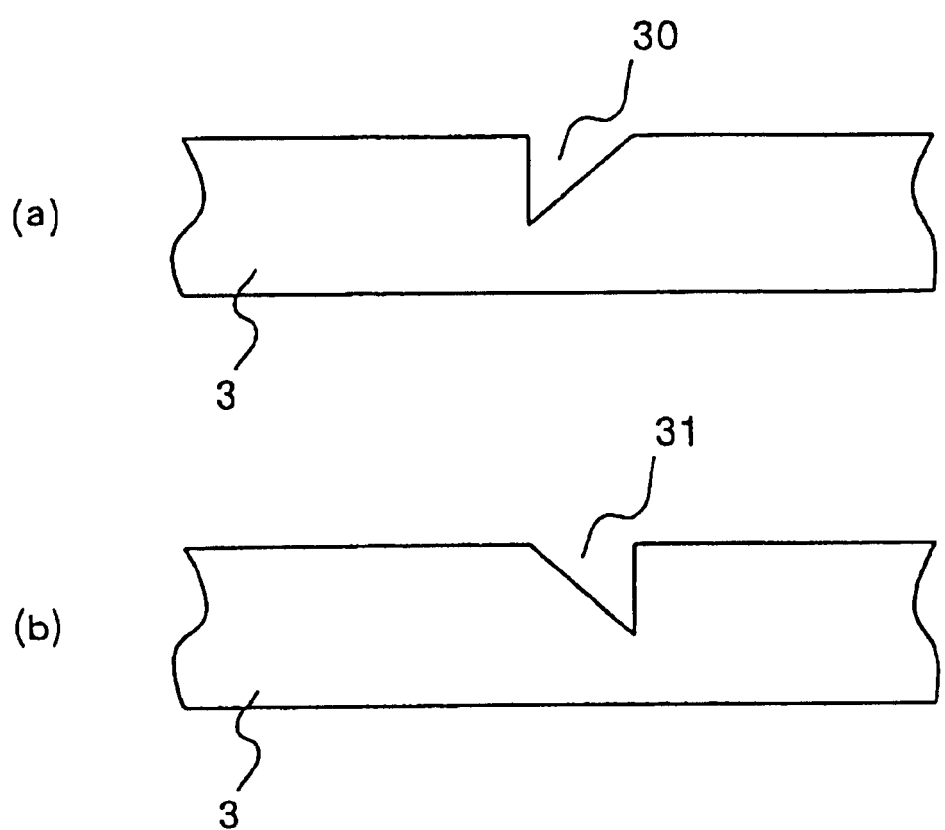
FIG. 4 is a figure explaining the recorded bits of the information recording medium according to Embodiment 2.

Herein, the servo bit 30 and 31 is asymmetric left and right about the center axis 20 of the read-out track in a depth direction of the information recording medium 3, and particularly a groove having a depth constantly increased in one direction. Furthermore, the servo bit 30 and the servo bit 31 are arranged alternately on the center axis 20 of the read-out track and with difference in a direction of the left-and-rift asymmetric form. FIG. 4 is a sectional view of the servo bits 30 and 31 in a radial direction of the information recording medium 3. In FIG. 4, provided that the left side of the page is given as an inner-diameter direction of the information recording medium 3 and the right side of the page is given as an outer-diameter direction of the information recording medium 3, the servo bit 30 as shown in FIG. 4(a) is a groove having a triangular section increasing in depth in the inner-diameter direction. Also, the servo bit 31 as shown in FIG. 4(b) is a groove having a triangular section increasing in depth in the outer-diameter direction of the information recording medium 3. In particular, the servo bit 30 and the servo bit 31 are arranged on the center axis 20 of the read-out track such that they are equal in center depth. Incidentally, in this information recording medium 3, because the servo bits are arranged on the center axis of the read-out track, the spacing Tp' between the read-out track can be made comparatively small thus improving record density.

The operation of the information reproducing apparatus according to Embodiment 2 will be explained below on the assumption that the recorded bits are read out by the reproducing probe 1 by making the information recording medium 3 in a disk form and rotating it at its center by a rotary mechanism (not shown). First, in the case that reading out is made in a state the microscopic aperture 2 of the reproducing probe 1 at a center is along the center axis 20 of the read-out track on the information recording medium 3, i.e. where the center axis 20 of the read-out track is positioned on an area that the near-field light 5 produced in the microscopic aperture 2 is maximum in intensity, the reflection scatter light of the near-field light 5 obtained due to scatter by the data bits 22 in the data region exhibits sufficiently high intensity. Accordingly, it is possible to obtain reliable reproduced signals in accordance with the recording pattern of the data bits 22 through the photo-detectors 6 and 7.

Figure 5:
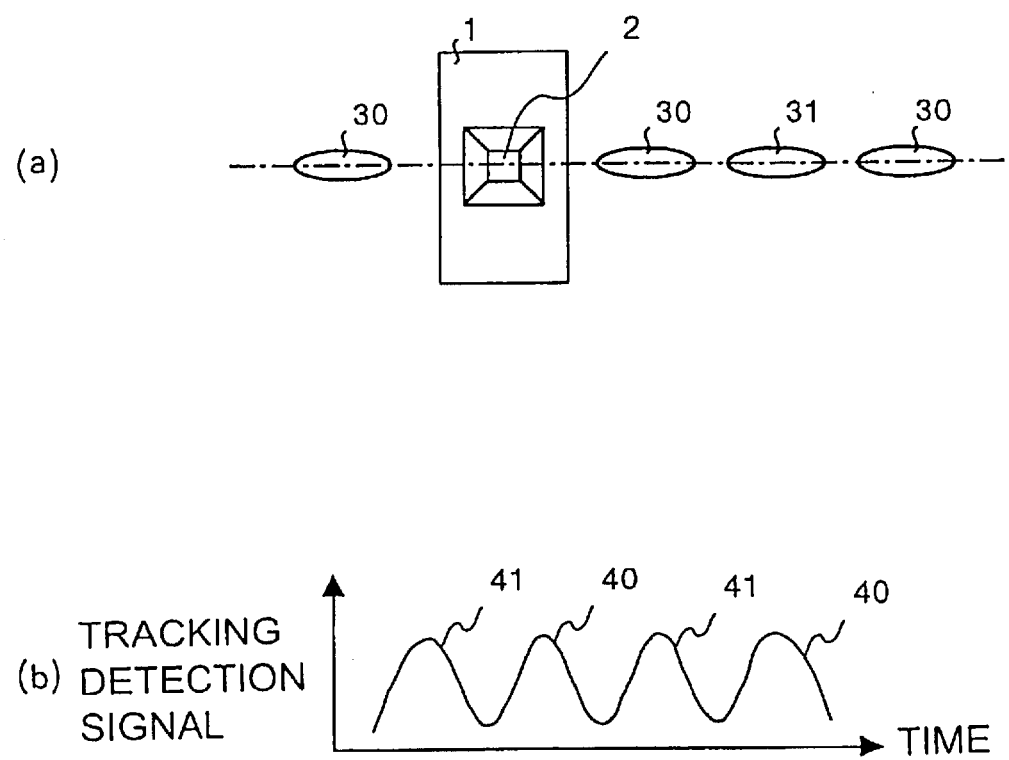
FIG. 5 is a figure explaining the operation of an information recording apparatus according to Embodiment 2.

FIG. 5 is a figure for explaining a position of the reproducing probe 1 in the servo pattern region in the above case (FIG. 5(a)) and a tracking detection signal detected in the photo-detectors 6 and 7 (FIG. 5(b)). In FIG. 5(b), tracking detection signals 40 and 41 respectively correspond to tracking detection signals obtained from the servo bits 30 and 31. Incidentally, the reflection scatter light of the near-field light 5 obtained through scattering by the servo bits 30 and 31 is also outputted as tracking detection signals through the photo-detectors 6 and 7. Herein, the servo bits 30 and 31 are alternately formed at a constant interval throughout the read-out track in the servo pattern region. Consequently, when the reproducing probe 1 passes the servo pattern region, from the photo-detectors 6 and 7 is outputted a tracking detection signal with a period determined by a reading rate (rotation velocity of the information recording medium 3). Particularly, the servo bits 30 and 31 are made equal in depth on the track center axis 20 to each other. Accordingly, as shown in FIG. 5(a), where reading out is made in a state that the microscopic aperture 2 of the reproducing probe 1 at a center is along the center axis 20 of the read-out track of the information recording medium 3, tracking detection signals 40 and 41 obtained for the servo bits 30 and 31 are equal in intensity as shown in FIG. 5(b).

Next, in the case that reading out is made in a state the microscopic aperture 2 of the reproducing probe 1 at the center is deviated off the center axis 20 of the read-out track on the information recording medium 3, i.e. where the center axis 20 of the read-out track is positioned deviated off an area that the near-field light 5 produced in the microscopic aperture 2 is maximum in intensity, the reflection scatter light of the near-field light 5 obtained due to scattering by the data bits 22 in the data region does not exhibit sufficiently high intensity. Accordingly, in order to obtain a reproduced signal that the information pattern of the data bits 22 is positively reproduced through the photo-detectors 6 or 7, there is a need of tracking control to move the reproducing probe 1 to the center axis 20 of the read-out track.

Figure 6:
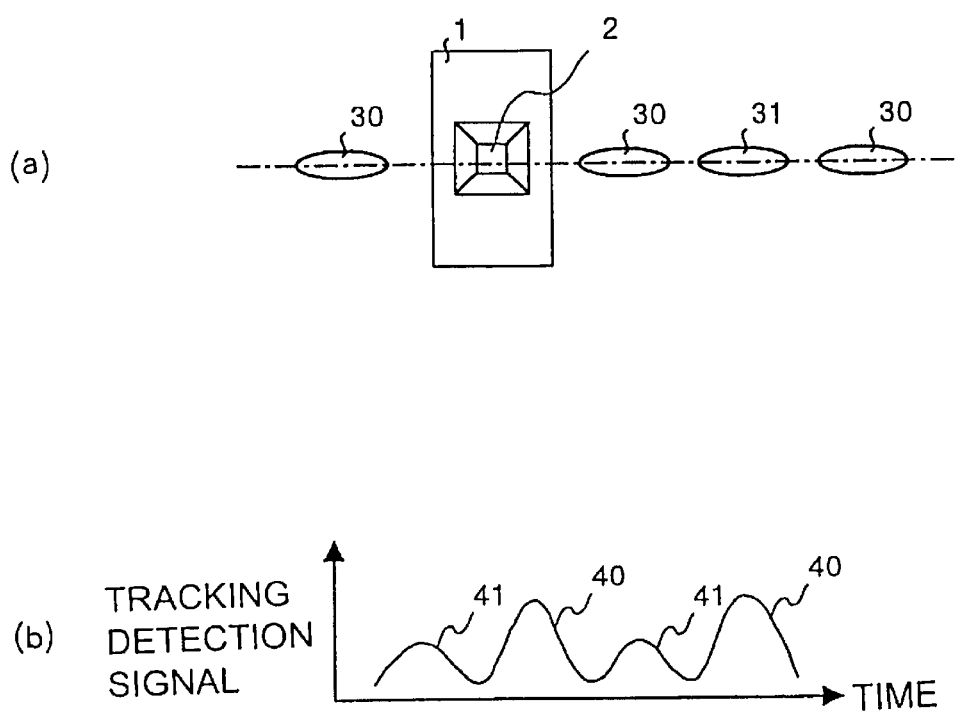
FIG. 6 is a figure explaining the operation of the information recording apparatus according to Embodiment 2.

FIG. 6 is a figure for explaining a state that the reproducing probe 1 is deviated toward the outer diameter of the information recording medium 3 with respect to the read-out track (FIG. 6(a)) and a tracking detection signal detected in the photo-detectors 6 and 7 (FIG. 6(b)). Note that, in FIG. 6, the upper side of the page is given as the outer diameter direction of the information recording medium 3 while the lower side of the page is given as the inner diameter direction of the information recording medium 3. In FIG. 6(b), tracking detection signals 40 and 41 are respectively correspond to the signals obtained from the servo bits 30 and 31. Herein, the near-field light 5 exhibits an intensity distribution that the intensity decreases as the distance increases from the microscopic aperture 2 of the reproducing probe 1. Consequently, as in FIG. 6(a), the near-field light 5 in a position the reproducing probe 1 deviates toward the outer diameter of the reproducing probe 1 is scattered in a shallower position in the servo bit 30 and in a deeper position in the servo bit 31. That is, the tracking detection signal 40 obtained from the servo bit 30 exhibits a greater value than the tracking detection signal 41 obtained from the servo bit 31, as shown in FIG. 6(b).

Figure 7:
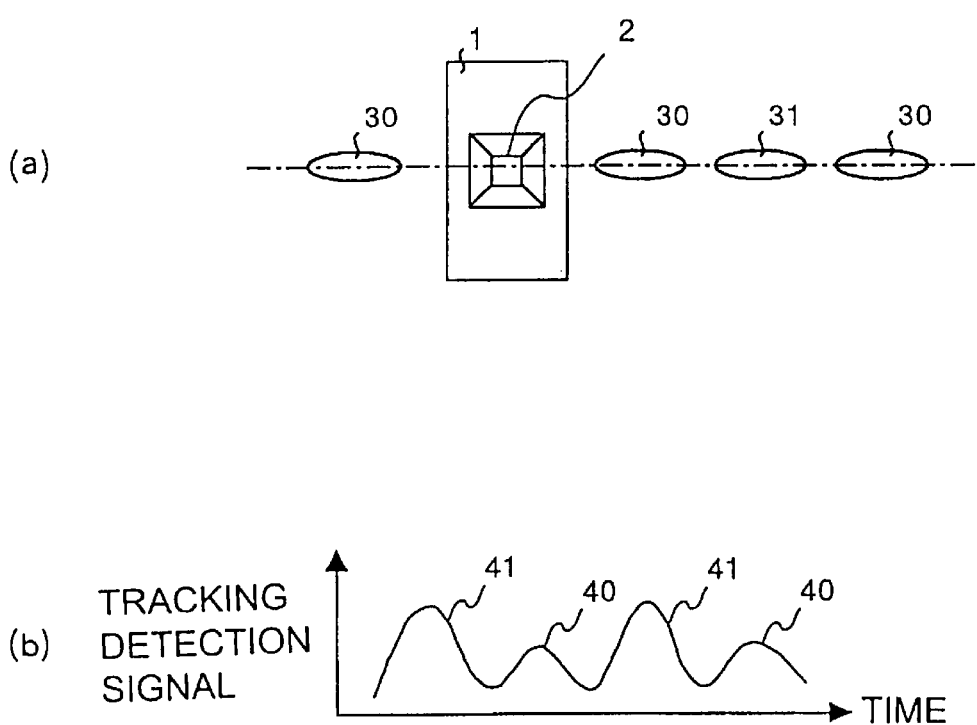
FIG. 7 is a figure explaining the operation of the information recording apparatus according to Embodiment 2.

FIG. 7 is a figure for explaining a state that, conversely to the FIG. 6 case, the reproducing probe 1 is deviated toward the inner diameter of the information recording medium 3 with respect to the read-out track (FIG. 7(a)) and a tracking-detection signal detected in the photo-detectors 6 and 7 (FIG. 7(b)). Note that, in FIG. 7, the upper side of the page is given as the inner-diameter direction of the information recording medium 3 while the lower side of the page is given as the outer-diameter direction of the information recording medium 3. In FIG. 7(b), tracking detection signals 40 and 41 are respectively correspond to the signals obtained from the servo bits 30 and 31. As shown in FIG. 7, the near-field light 5 in a position where the reproducing probe 1 deviates toward the outer diameter is scattered in a deeper position in the servo bit 30 and in a shallower position in the servo bit 31. That is, the tracking detection signal 41 obtained from the servo bit 31 exhibits a greater value than the tracking detection signal 40 obtained from the servo bit 30, as shown in FIG. 7(b).

As explained above, when reproducing probe 1 passes the servo pattern region in a state the microscopic aperture 2 at its center of the reproducing probe 1 is off the center axis 20 of the read-out track on the information recording medium 3, outputted is a tracking detection signal having a waveform alternately repeating high and low intensities.

Herein, the electric signal (reproduced signal and tracking detection signal) outputted from the photo-detectors 6 and 7 is at all times subjected to amplification and add operation in the add circuit 10 and outputted as an add signal to the detection-signal extracting circuit 11. In the detection-signal extracting circuit 11, determination is made as to whether the reproducing probe 1 at present is passing the data region or the servo pattern region, by the use of a synchronization signal with a period determined by a reading rate (rotation velocity of the information recording medium 3). In the case that the reproducing probe 1 is passing the data region, the add signal outputted from the add circuit 10 is inputted as a reproduced signal to the reproduced-data output circuit 12. Where the reproducing probe 1 is passing the servo pattern region, the add signal outputted from the add circuit 10 is inputted as a tracking detection signal to the tracking signal producer 13.

As described above, where reading out is made in the state that the center of the microscopic aperture 2 of the reproducing probe 1 is off the center axis 20 of the read-out track and a tracking detection signal having a waveform alternately repeating high and low intensities is inputted to the tracking signal producer 13, the tracking signal reproducer 13 first compares the waveform represented by the tracking detection signal, particularly the magnitude of signals for the beginning two servo bits in the servo pattern region. Depending on the relationship in magnitude, it is determined whether the reproducing probe 1 at present is deviated toward an inner peripheral side or an outer peripheral side of the information recording medium 3. Further, by operating an intensity difference between the signals, a tracking signal is produced that represents a moving direction and moving amount of the reproducing probe 1 and this tracking signal is outputted. In the actuator 14, the reproducing probe is moved depending on the tracking signal outputted from the tracking signal reproducer 13, thereby achieving tracking control.

That is, in this tracking control, as shown in FIG. 6(*a*), in a state that the reproducing probe 1 deviates in the outer-diameter direction of the information recording medium 3 with respect to the read-out track, the reproducing probe 1 is moved toward the inner diameter of the information recording medium 3 to the center axis of the read-out track. As shown in FIG. 7(*a*), in a state that the reproducing probe 1 deviates in the inner-diameter direction of the information recording medium 3 with respect to the read-out track, the reproducing probe 1 is moved toward the outer diameter of the information recording medium 3 to the center axis of the read-out track.

Figure 8:
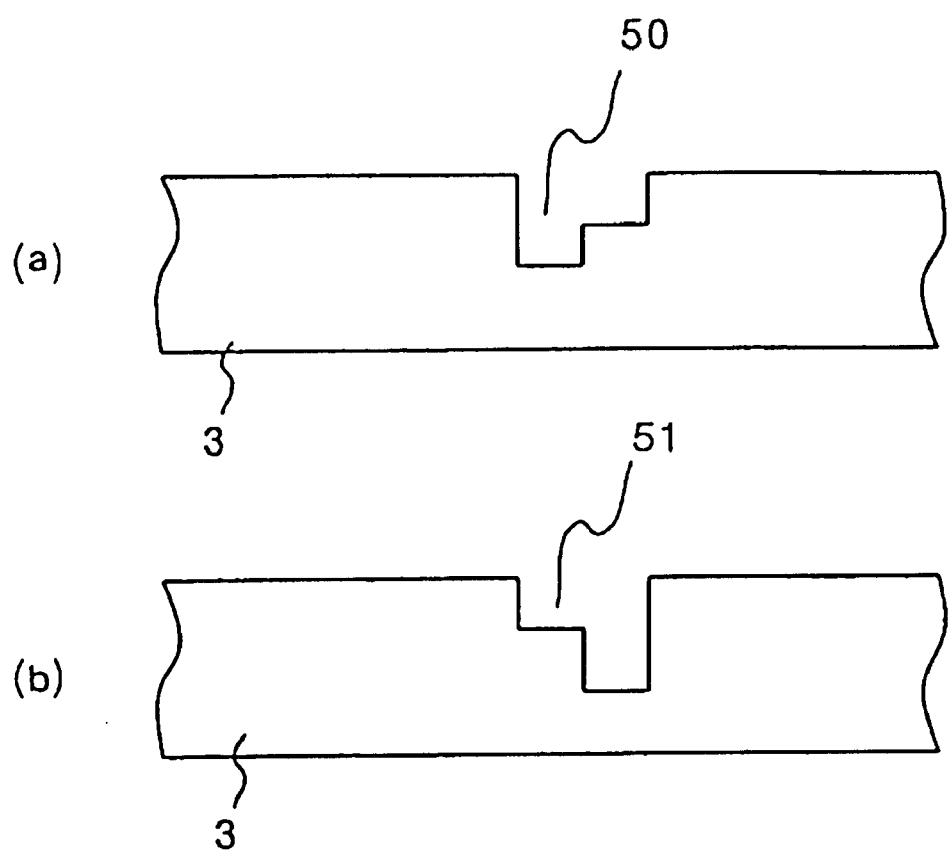
FIGS. 8(a) and 8(b) show other examples of the recorded bits of an information recording medium according to Embodiment 2.

Incidentally, in Embodiment 2 explained above, the servo bits were formed in the servo pattern region of the information recording medium 3 such that its section is of a triangular groove. In place of this, as shown in FIGS. 8(*a*) and 8(*b*), grooves 50 and 51 may be formed stepwise in radial section of the information recording medium 3.

As explained above, according to the information recording medium according to Embodiment 2, on the read-out track are provided a data region forming data bits for reproduction data and a servo pattern region forming servo bits for tracking control. Furthermore, as servo bits in the servo pattern region are arranged grooves that are asymmetric left and right about the center axis of the read-out track and have a depth constantly increased, alternately on the center axis of the read-out track and differently in direction of the left-and-right asymmetric form from one another. Accordingly, it is possible to provide a tracking detection signal for tracking control from a difference in servo-bit depth in a position deviated from the center axis of the read-out track. Also, according to the information recording apparatus according to Embodiment 2, in the servo pattern region of the information recording medium, a tracking detection signal can be obtained that has a waveform different depending upon a deviation of the center axis of the read-out track. From a waveform pattern of this tracking detection signal, tracking control can be made for the reproducing probe. Also, because the near-field light produced in the microscopic aperture of the reproducing probe is utilized as a signal for tracking control, accurate tracking control is achieved with high positional resolving power. Furthermore, because the optical system used for reproduced-signal detection and tracking-signal detection is integrated without separation, the apparatus structure can be simplified.

(Embodiment 3)

Next, an information reproducing apparatus according to Embodiment 3 is explained. Because the schematic structure of an information reproducing apparatus according to Embodiment 3 is similar to FIG. 1 explained in Embodiment 1, the explanation thereof is herein omitted. The information reproducing apparatus according to Embodiment 3 has servo bits, formed in a servo pattern region in the information recording medium 3 in Embodiment 2, having a shape in asymmetric in a plane direction about a center axis of the read-out track.

Figure 9:
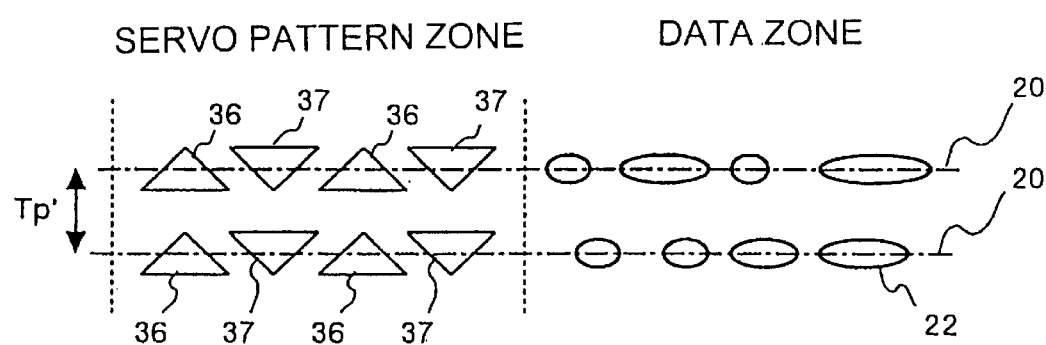
FIG. 9 is a figure showing the recorded bits of an information recording medium according to Embodiment 3.

FIG. 9 is a figure showing recorded bits on the information recording medium 3 to be reproduced in the information reproducing apparatus according to Embodiment 3. In FIG. 9, the information recording medium 3 is provided, on a track to be read out by the reproducing probe 1, with a data region forming data bits for reproduced data and a servo-pattern region forming servo bits for tracking control. In the data region, the data bits 22 are arranged in a predetermined information pattern such that a center axis thereof coincides with a center axis 20 of the read-out track. On the other hand, in the servo pattern region, the servo bits 36 and 37 are formed at a constant interval such that a center axis thereof coincides with the center axis 20 of the read-out track of the reproducing probe 1 similarly to the data bits 22.

Herein, the servo bits 36 and 37 are in a form asymmetric left and right, e.g. in a triangular form, about the center axis 20 of the read-out track in a plane direction of the information recording medium 3, and particularly, grooves having an interval constantly increased in a track direction. Furthermore, the servo bit 36 and the servo bit 37 are arranged alternately different in direction of the left-and-right asymmetric form on the center axis 20 of the read-out track. In particular, the servo bit 36 and the servo bit 37 are arranged such that their positions mutually equal in interval in a track direction are made coincident with the center axis 20 of the read-out track. Incidentally, because in the information recording medium 3 the servo bits are arranged on the center axis of the read-out track, the read-out-track spacing Tp' can be given comparatively small, improving record density.

The operation of the information reproducing apparatus according to Embodiment 3 will be explained below on the assumption that the recorded bits are read out by the reproducing probe 1 by making the information recording medium 3 in a disk form and rotating it at its center by a rotary mechanism (not shown). First, in the case that reading out is made in a state the microscopic aperture 2 of the reproducing probe 1 at a center is along the center axis 20 of the read-out track on the information recording medium 3, i.e. where the center axis 20 of the read-out track is positioned on an area that the near-field light 5 produced in the microscopic aperture 2 is maximum in intensity, the reflection scatter light of the near-field light 5 obtained due to scattering by the data bits 22 in the data region exhibits sufficiently high intensity. Accordingly, it is possible to obtain reproduced signals in accordance with the recording pattern of the data bits 22 through the photo-detectors 6 and 7.

Herein, the servo bits 36 and 37 are alternately formed at a certain constant interval throughout the entire read-out track in the servo pattern region. Consequently, when the reproducing probe 1 passes the servo pattern region, a tracking detection signal is outputted with a period determined by a reading rate (rotation velocity of the information recording medium 3) from the photo-detectors 6 and 7. In particular, because the servo bits 36 and 37 are arranged equal in interval on the center axis 20 of the track, where reading out is made in a state the center of the microscopic aperture 2 of the reproducing probe 1 is along the center axis 20 of the read-out track on the information recording medium 3, the intensity of a tracking signal to be obtained on the servo bits 36 and 37 is equal.

Next, in the case that reading out is made in a state the microscopic aperture 2 of the reproducing probe 1 at a center is deviated off the center axis 20 of the read-out track on the information recording medium 3, i.e. where an area that the near-field light 5 produced in the microscopic aperture 2 is maximum in intensity is deviated from the center axis 20 of the read-out track, the reflection scatter light of the near-field light 5 obtained due to scattering by the data bits 22 in the data region does not exhibit sufficiently high intensity. Accordingly, in order to obtain a reproduced signal that the information pattern of the data bits 22 is positively reproduced through the photo-detectors 6 and 7, there is a need of tracking control to move the reproducing probe 1 to the center axis 20 of the read-out track.

Incidentally, where a scattering object exists in a near-field light distribution produced from the microscopic aperture 2, the near-field light 5 causes reflection scatter light having an intensity dependent upon the size of the scattering object. In FIG. 9, provided that the upper side of the page is in the outer-diameter direction of the information recording medium 3 while the lower side of the page is in the inner-diameter direction of the information recording medium 3, the near-field light 5 in a position deviated toward the inner diameter of the reproducing probe 1 is scattered more in the servo bit 36 and less in the servo bit 37. That is, the tracking detection signal obtained from the servo bit 36 exhibits a greater value than the tracking detection signal obtained from the servo bit 37.

Meanwhile, conversely to the above case, the near-field light 5 in a position the reproducing probe 1 is deviated toward the outer diameter of the information recording medium 3 with respect to the read-out track is scattered more in the servo bit 37 and less in the servo bit 36. That is, the tracking detection signal obtained from the servo bit 37 exhibits a greater value than the tracking detection signal obtained from the servo bit 36.

As explained above, when the reproducing probe 1 passes the servo pattern region in a state that the microscopic aperture 2 of the reproducing probe 1 at the center deviates from the center axis 20 of the read-out track of the information recording medium 3, outputted is a tracking detection signal having a waveform alternately repeating high and low intensities.

Herein, the electric signal (reproduced signal and tracking detection signal) outputted from the photo-detectors 6 and 7 is subjected at all times to amplification and add operation in the add circuit 10 and outputted as an add signal to the detection-signal extracting circuit 11. In the detection-signal extracting circuit 11, determination is made as to whether the reproducing probe at present is passing the data region or the servo pattern region, by the use of a synchronization signal with a period determined by a reading rate (rotation velocity of the information recording medium 3). In the case that the reproducing probe 1 is passing the data region, the add signal outputted from the add circuit 10 is inputted as a reproduced signal to the reproduced-data output circuit 12. Where the reproducing probe 1 is passing the servo pattern region, the add signal outputted from the add circuit 10 is inputted as a tracking detection signal to the tracking signal producer 13.

As described above, where reading out is made in the state that the center of the microscopic aperture 2 of the reproducing probe 1 is off the center axis 20 of the read-out track of the information recording medium 3 and a tracking signal having a waveform alternately repeating high and low intensities is inputted to the tracking signal producer 13, the tracking signal reproducer 13 first compares the waveform represented by the tracking detection signal, particularly the magnitude of signals for the beginning two servo bits in the servo pattern region. Depending on the relationship in magnitude, it is determined whether the reproducing probe 1 at present is deviated toward an inner peripheral side or an outer peripheral side of the information recording medium 3. Further, by operating an intensity difference between the signals, a tracking signal is produced that represents a moving direction and moving amount of the reproducing probe 1. This tracking signal is outputted to the actuator 14.

In the actuator 14, the reproducing probe is moved depending on the tracking signal outputted from the tracking signal reproducer 13, thereby achieving tracking control.

Incidentally, although in the Embodiment 3 explained above the servo bits were formed as grooves made in a triangular form in its plane direction, stepwise grooves in place of this may be formed in the plane direction. Furthermore, instead of the grooves, they may be formed using marks having a shape that the interval in a track direction is constantly increased in one direction (material having a property that the ratio with which near-field light is scattered is locally different, particularly the refractive index differs from the surrounding).

As explained above, according to the information recording medium according to Embodiment 3, on the read-out track are provided a data region forming data bits for reproduction data and a servo pattern region forming servo bits for tracking control. Furthermore, arranged as servo bits in the servo pattern region are grooves in a form asymmetric left and right about the center axis 20 of the read-out track and an interval increased in the track direction, alternately on the center axis of the read-out track and differently in direction of the left-and-right asymmetric form from one another. Accordingly, it is possible to provide a tracking detection signal for tracking control from a difference in servo-bit interval in a position deviated from the center axis of the read-out track. Also, according to the information recording apparatus according to Embodiment 3, in the servo pattern region of the information recording medium, a tracking detection signal can be obtained that has a waveform different depending upon a deviation of the center axis of the read-out track. From a waveform pattern of this tracking detection signal, tracking control can be made for the reproducing probe. Also, because the near-field light produced in the microscopic aperture of the reproducing probe is utilized as a signal for tracking control, accurate tracking control is achieved with high positional resolving power. Furthermore, because the optical system used for reproduced-signal detection and tracking-signal detection is integrated without separation, the apparatus structure can be simplified.

(Embodiment 4)

Next, an information reproducing apparatus according to Embodiment 4 is explained. Because the schematic structure of an information reproducing apparatus according to Embodiment 4 is similar to FIG. 1 explained in Embodiment 1, the explanation thereof is herein omitted. The information reproducing apparatus according to Embodiment 4 is not formed with servo bits for tracking control on the information recording medium 3 but devised in data bits form to obtain reproduced data from the data bits and acquire a tracking detection signal for tracking control.

Figure 10:
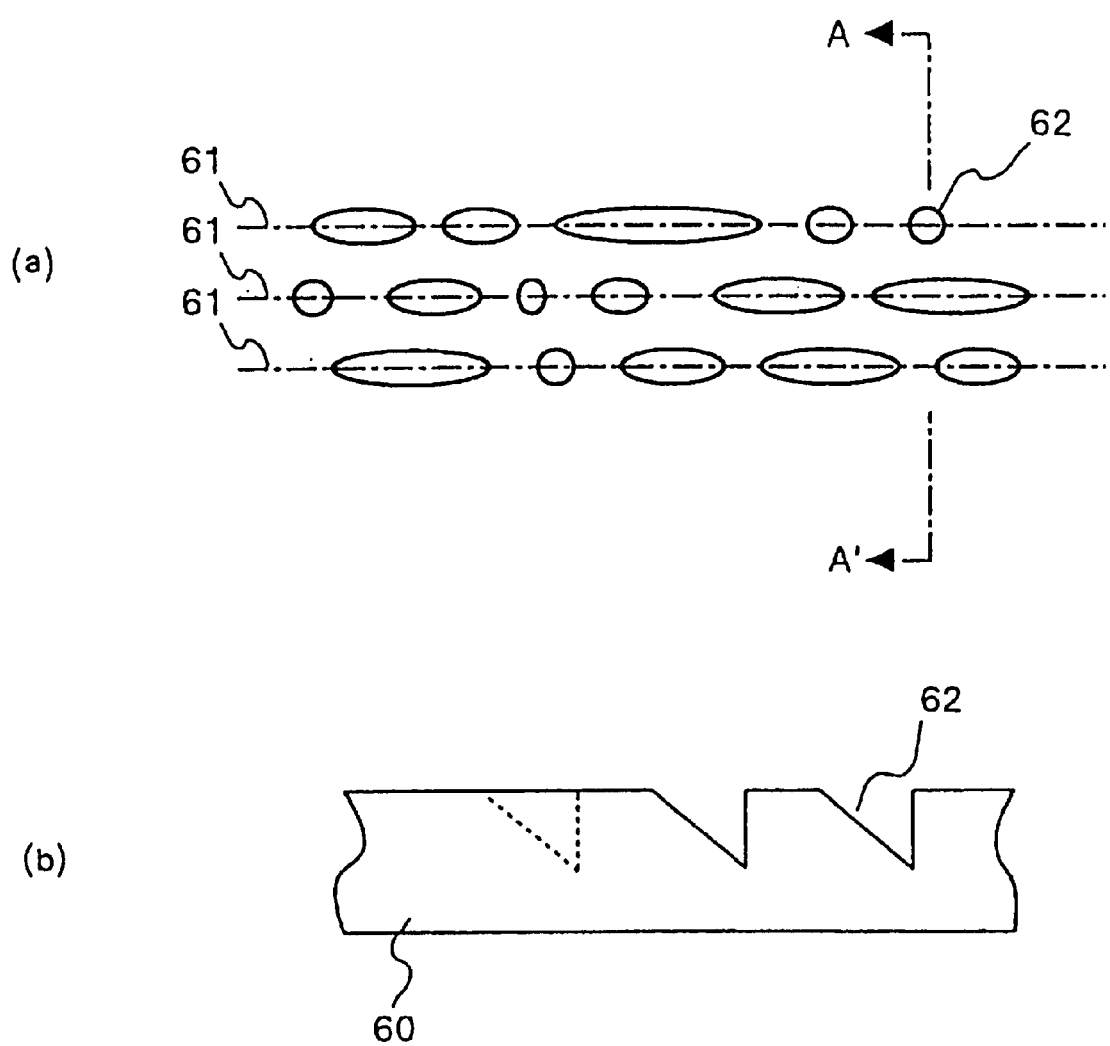
FIG. 10 is a figure explaining the recorded bits of an information recording medium according to Embodiment 4.

FIG. 10 is a figure showing recorded bits on the information recording medium 60 to be reproduced in the information reproducing apparatus according to Embodiment 4. In FIG. 10(*a*), the information recording medium 60 has, on a track to be read out by the reproducing probe 1, data bits 62 for reproduction data arranged in an information pattern to show reproduction data with a center axis thereof coincided with a center axis 61 of the read-out track. Herein, the data bits 62 are in a form asymmetric left and right about the center axis 61 of the read-out track in a depth direction of the information recording medium 60, particularly in grooves having a depth constantly increased in one direction. Furthermore, the data bits 62 are arranged on the center axis 61 of the read-out track with their left-and-right asymmetric form aligned in direction. FIG. 10(*b*) shows a section in A–A' of FIG. 10(a), wherein the data bit 62 is triangular in section as shown in FIG. 10(b).

The operation of the information reproducing apparatus according to Embodiment 4 will be explained below on the assumption that data bits are read out by the reproducing probe 1 by making the information recording medium 60 in a disk form and rotating it at its center by a rotary mechanism (not shown). First, in a state the microscopic aperture 2 of the reproducing probe 1 at a center is along the center axis 61 of the read-out track on the information recording medium 60, the reflection scatter light of the near-field light 5 obtained due to scattering by the data bits 62, i.e. the intensity of an electric signal obtained in the photo-detectors 6 and 7, is previously stored as a reference value in a storage section (not shown) of the detection-signal extracting circuit 11. This reference value represents a detection signal for the data bit where reading out is made by the reproducing probe 1 in a correct position.

Next, explanation is made on a case that reading out is made in a state the microscopic aperture 2 of the reproducing probe 1 at the center is deviated from the center axis 61 of the read-out track on the information recording medium 60, i.e. positioned with deviation are an area where the near-field light 5 produced in the microscopic aperture 2 is maximum in intensity and the center axis 61 of the read-out track. In FIG. 10(a), provided that the upper side of the page is in an outer-diameter direction of the information recording medium 60 while the lower side of the page is in an inner-diameter direction of the information recording medium 60, the near-field light 5 exhibits an intensity distribution that the intensity decreases as the distance increases from the microscopic aperture 2 of the reproducing probe 1. Accordingly, for example, the near-field light 5 in a position deviated toward the outer-diameter is scattered at a deeper position in the data bit 62. That is, the tracking detection signal obtained from the data bit 62 exhibits a value smaller than the reference value.

Conversely, the near-field light 5 in a position the reproducing probe 1 is deviated toward the inner-diameter is scattered at a shallower position in the data bit 62. That is, the tracking detection signal obtained from the data bit 62 exhibits a value greater than the reference value.

Herein, the electric signal (reproduced signal and tracking detection signal) outputted from the photo-detectors 6 and 7 is subjected at all times to amplification and add operation in the add circuit 10 and outputted as an add signal to the detection-signal extracting circuit 11. In the detection-signal extracting circuit 11, the add signal outputted from the add circuit 110 is outputted as a reproduced signal to the reproduced-data output circuit 12, and comparison-operated with the reference value and inputted as a tracking detection signal including a difference value and symbol to the tracking signal producer 13.

As described above, where reading out is made in the state that the microscopic aperture 2 of the reproducing probe 1 at its center is off the center axis 61 of the read-out track on the information recording medium 3, a tracking signal representative of a moving direction and moving amount of the reproducing probe 1 is first produced in the tracking signal producer 13 from a difference value and symbol represented by the tracking detection signal, and this tracking signal is outputted to the actuator 14. In the actuator 14, the reproducing probe 1 is moved depending on the tracking signal outputted from the tracking signal producer 13 thereby achieving tracking control.

That is, in this tracking control, in the state that the reproducing probe 1 is deviated toward the outer diameter of the information recording medium 60 with respect to the read-out track, the reproducing probe 1 is moved toward the inner diameter of the information recording medium 60 up to the center axis of the read-out track. In the state that the reproducing probe 1 is deviated toward the inner diameter of the information recording medium 60 with respect to the read-out track, the reproducing probe 1 is moved toward the outer diameter of the information recording medium 60 up to the center axis of the read-out track.

Incidentally, in Embodiment 4 explained above, the data bits were formed such that its section is in a triangular groove. In place of this, they may be formed such that the section in a radial direction of the information recording medium 3 is in a stepwise groove. Furthermore, instead of forming asymmetric-formed grooves in a depth direction, formed may be grooves having a form that the interval in a track direction is constantly increased in a plane direction or marks (material having a property locally different in ratio of scattering near-field light such that the refractive index is different from that of the surrounding).

As explained above, according to the information recording medium according to Embodiment 4, formed as data bits are grooves, that are non-symmetric left and right about the center axis 61 of the read-out track and having a depth constantly increased in one direction are prepared and deployed direction of their depth that right and left are non-symmetric. Accordingly, it is possible to provide a tracking detection signal for tracking control from the difference in data-bit depth in a position deviated from the center axis of the read-out track. Also, according to the information reproducing apparatus according to Embodiment 4, tracking signals can be obtained that have an intensity different depending upon a deviation of the center axis of the read-out track. From a comparison between the intensity of the tracking detection signal and the predetermined reference value, tracking control can be made for the reproducing probe. Also, because the near-field light produced in the microscopic aperture of the reproducing probe is utilized for a signal for tracking control, accurate tracking control is achieved with positional resolving power. Furthermore, because the optical systems used in reproduced-signal detection and tracking-signal detection are integrated without separation, the apparatus structure can be simplified.

(Embodiment 5)

Next, an information reproducing apparatus according to Embodiment 5 is explained. Because the schematic structure of an information reproducing apparatus according to Embodiment 5 is similar to FIG. 1 explained in Embodiment 1, the explanation thereof is herein omitted. The information reproducing apparatus according to Embodiment 5 is not formed with servo bits for tracking control on the information recording medium but has a read-out track itself slant in one direction to form data bits on the read-out track.

Figure 11:
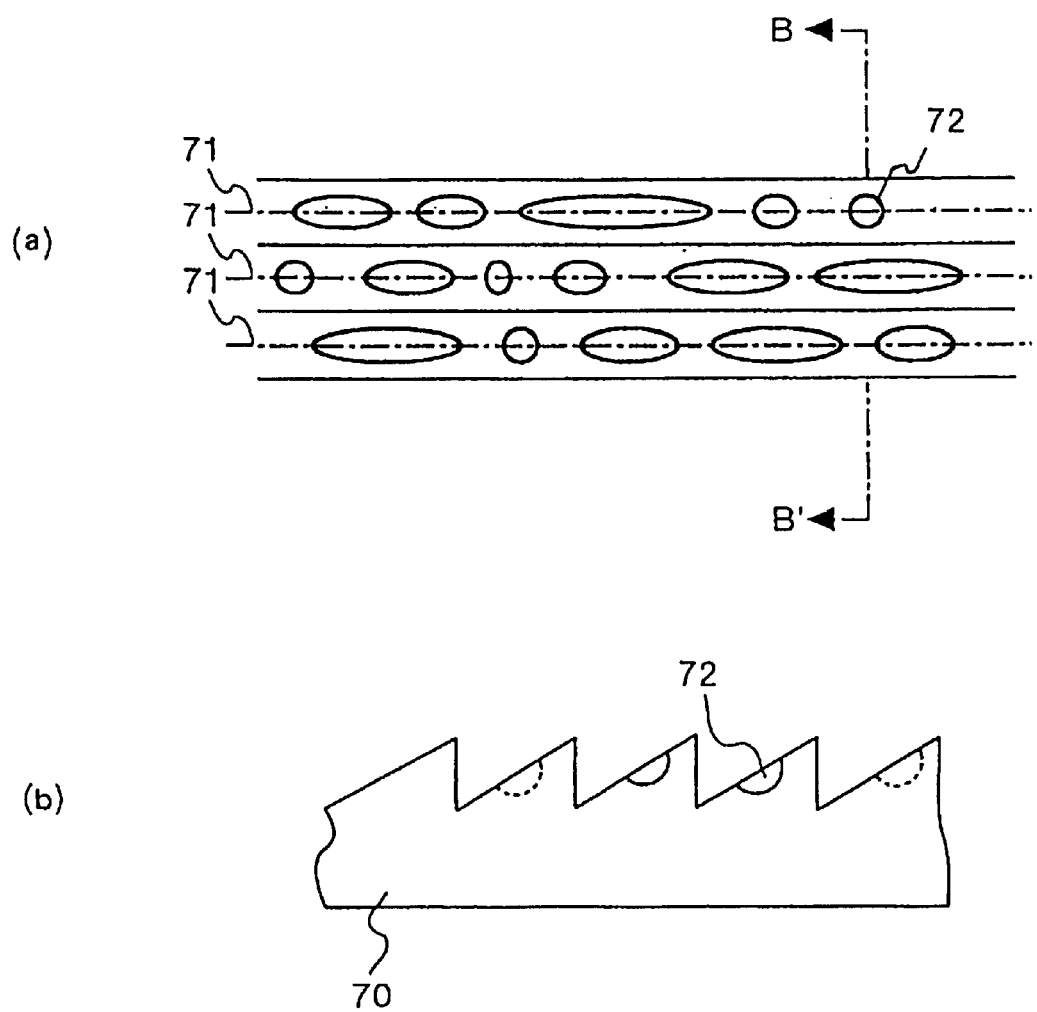
FIG. 11 is a figure explaining the recorded bits and read-out track of an information recording medium according to Embodiment 5.

FIG. 11 is a figure showing data bits on the information recording medium 70 to be reproduced in the information reproducing apparatus according to Embodiment 5. In FIG. 11(a), the information recording medium 70 has, on a track to be read out by the reproducing probe 1, data bits 72 for reproduction data arranged in an information pattern to show reproduction data with a center axis thereof coincided with a center axis 71 of the read-out track. Herein, each read-out track is slanted at a constant angle in one direction. That is, the section in B–B' of FIG. 11(a) is in a saw-tooth form as in FIG. 11(b). The slant surface of each saw tooth is made for a read-out track to form data bits along the slant surface.

The operation of the information reproducing apparatus according to Embodiment 5 will be explained below on the assumption that data bits are read out by the reproducing probe 1 by making the information recording medium 70 in a disk form and rotating it at its center by a rotary mechanism (not shown). First, in a state the microscopic aperture 2 of the reproducing probe 1 at a center is along the center axis 71 of the read-out track on the information recording medium 70, the reflection scatter light of the near-field light 5 obtained due to scattering by the data bits 72, i.e. the intensity of an electric signal obtained in the photo-detectors 6 and 7, is previously stored as a reference value in a storage section (not shown) of the detection-signal extracting circuit 11. This reference value represents a detection signal for the data bit where reading out is made by the reproducing probe 1 in a correct position.

Next, explanation is made on a case that reading out is made in a state the microscopic aperture 2 of the reproducing probe 1 at the center is deviated from the center axis 71 of the read-out track on the information recording medium 70, i.e. positioned with deviation are an area where the near-field light 5 produced in the microscopic aperture 2 is maximum in intensity and the center axis 71 of the read-out track. In FIG. 11(*a*), provided that the upper side of the page is in an outer-diameter direction of the information recording medium 70 while the lower side of the page is in an inner-diameter direction of the information recording medium 70, the near-field light 5 exhibits an intensity distribution that the intensity decreases as the distance increases from the microscopic aperture 2 of the reproducing probe 1. Accordingly, for example, the near-field light 5 in a position of the reproducing probe 1 deviated toward the outer-diameter is scattered at a shallower position on the slant surface of the read-out track forming the data bits 72. That is, the tracking detection signal obtained from the data bit 72 exhibits a value greater than the reference value.

Conversely, the near-field light 5 in a position the reproducing probe 1 is deviated toward the inner-diameter of the information recording medium 70 is scattered at a deeper position on the slant surface of the read-out track forming the data bit 72. That is, the tracking detection signal obtained from the data bit 72 exhibits a value smaller than the reference value.

Herein, the electric signal (reproduced signal and tracking detection signal) outputted from the photo-detectors 6 and 7 is subjected at all times to amplification and add operation in the add circuit 10 and outputted as an add signal to the detection-signal extracting circuit 11. In the detection-signal extracting circuit 11, the add signal outputted from the add circuit 10 is outputted as a reproduced signal to the reproduced-data output circuit 12, and comparison-operated with the reference value and inputted as a tracking detection signal including a difference value and symbol to the tracking signal producer 13.

As described above, where reading out is made in the state that the microscopic aperture 2 of the reproducing probe 1 at its center is off the center axis 71 of the read-out track on the information recording medium 70, a tracking signal representative of a moving direction and moving amount of the reproducing probe 1 is first produced in the tracking signal producer 13 from a difference value and symbol represented by the tracking detection signal, and this tracking signal is outputted to the actuator 14. In the actuator 14, the reproducing probe 1 is moved depending on the tracking signal outputted from the tracking signal producer 13 thereby achieving tracking control.

That is, in this tracking control, in the state that the reproducing probe 1 is deviated toward the outer diameter of the information recording medium 70 with respect to the read-out track, the reproducing probe 1 is moved toward the inner diameter of the information recording medium 70 up to the center axis of the read-out track. In the state that the reproducing probe 1 is deviated toward the inner diameter of the information recording medium 70 with respect to the read-out track, the reproducing probe 1 is moved toward the outer diameter of the information recording medium 70 up to the center axis of the read-out track.

Incidentally, in Embodiment 5 explained above, the data bits 72 are formed as grooves or marks (material having a property locally different in scatter ratio of near-field light e.g. different in refractive index from the surroundings) on the read-out track.

As explained above, according to the information recording medium according to Embodiment 5, slant is provided in one direction for each read-out track. Accordingly, a tracking detection signal for tracking control can be provided from a depth difference of data bits in a position deviated from the center axis of the read-out track. Also, according to the information reproducing apparatus according to Embodiment 5, tracking signals can be obtained that have an intensity different depending upon a deviation of the center axis of the read-out track. From a comparison between the intensity of the tracking detection signal and the predetermined reference value, tracking control can be made for the reproducing probe. Also, because the near-field light produced in the microscopic aperture of the reproducing probe is utilized as a signal for tracking control, accurate tracking control is achieved with high positional resolving power. Furthermore, because the optical systems used in reproduced-signal detection and tracking-signal detection are integrated without separation, the apparatus structure can be simplified.

(Embodiment 6)

Next, an information reproducing apparatus according to Embodiment 6 is explained. Because the schematic structure of an information reproducing apparatus according to Embodiment 6 is similar to FIG. 1 explained in Embodiment 1, the explanation thereof is herein omitted. The information reproducing apparatus according to Embodiment 6 is not formed with servo bits for tracking control but formed only with data bits on the information recording medium whereby devising is made on the shape of a microscopic aperture of the reproducing probe.

Figure 12:
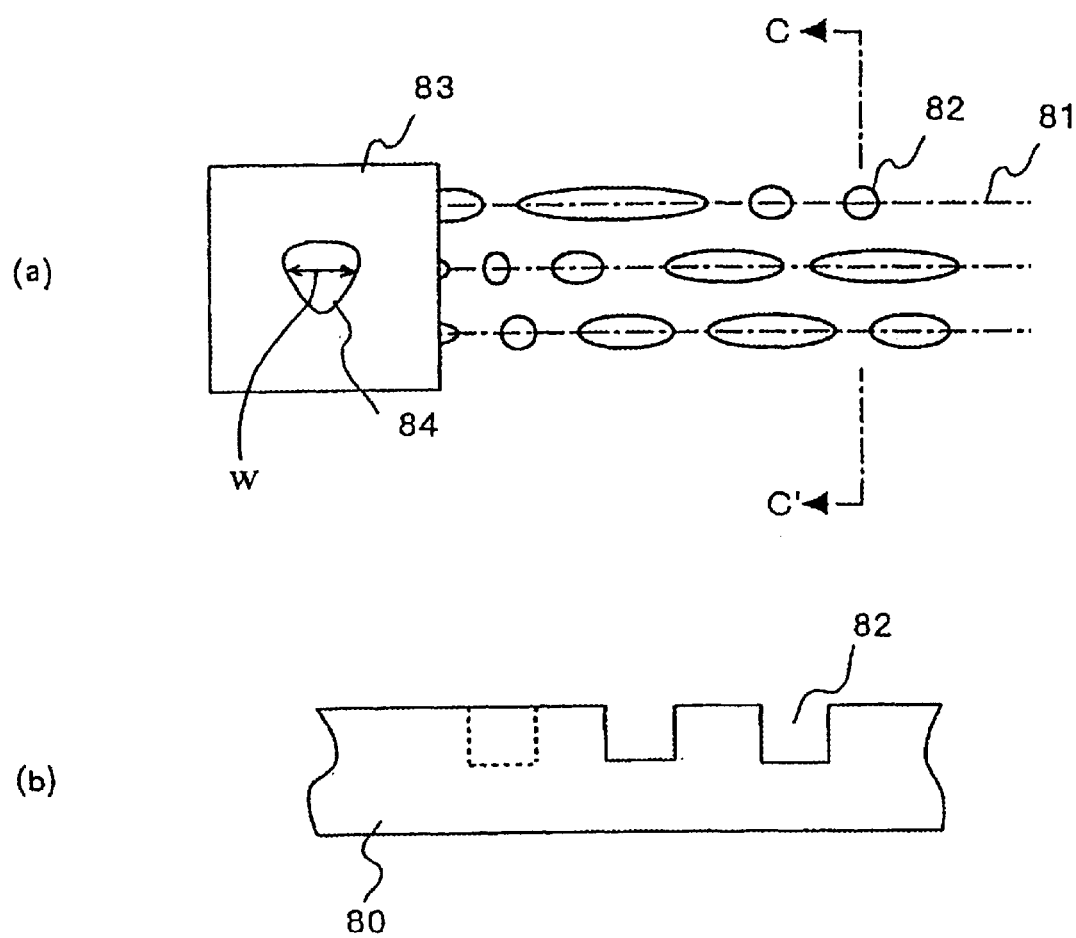
FIG. 12 is a figure explaining a reproducing probe of an information recording apparatus according to Embodiment 6.

FIG. 12 is a figure showing recorded bits on the information recording medium 80 to be reproduced and a reproducing probe 83 in the information reproducing apparatus according to Embodiment 6. In FIG. 12(*a*), the information recording medium 80 has, on a read-out track, data bits 82 for reproduction data arranged in an information pattern to show reproduction data with a center axis thereof coincided with a center axis 81 of the read-out track of the reproducing probe.

Herein, the microscopic aperture 84 of the reproducing probe 83 is asymmetric left and right about the center axis 81 of the read-out track in a plane direction of the information recording medium 80, particularly, in a shape constantly increased in interval in a track direction in one direction as shown in FIG. 12(*a*).

The operation of the information reproducing apparatus according to Embodiment 6 will be explained below on the assumption that data bits are read out by the reproducing probe 83 by making the information recording medium 80 in a disk form and rotating it at its center by a rotary mechanism (not shown). First, in a state the microscopic aperture 84 of the reproducing probe 83 at a center is along the center axis 81 of the read-out track on the information recording medium 80, the reflection scatter light of the near-field light 5 obtained due to scattering by the data bits 82, i.e. the intensity of an electric signal obtained in :the photo-detectors 6 and 7, is previously stored as a reference value in a storage section (not shown) of the detection-signal extracting circuit 11. This reference value represents a detection signal for the data bit where reading out is made by the reproducing probe 83 in a correct position.

Next, explanation is made on a case that reading out is made in a state the microscopic aperture 84 of the reproducing probe 83 at the center is deviated from the center axis 81 of the read-out track on the information recording medium 80. In FIG. 12(a), provided that the upper side of the page is in an outer-diameter direction of the information recording medium 80 while the lower side of the page is in an inner-diameter direction of the information recording medium 80, the near-field light 5 exhibits an intensity distribution that the intensity increases as the spacing increases. Accordingly, production is made with higher intensity in the outer diameter side of the information recording medium 80 while with lower intensity in the inner diameter side of the information recording medium 80. Consequently, in a position of the reproducing probe 83 deviated toward the outer diameter, reflection scatter light in smaller magnitude is obtained in the data bit 82. That is, the tracking detection signal obtained from the data bit 82 exhibits a value smaller than the reference value.

Conversely, in a position of the reproducing probe 83 deviated toward the inner diameter, reflection scatter light in greater magnitude is obtained in the data bit 82. That is, the tracking detection signal obtained from the data bit 82 exhibits a value greater than the reference value.

Herein, the electric signal (reproduced signal and tracking detection signal) outputted from the photo-detectors 6 and 7 is subjected at all times to amplification and add operation in the add circuit 10 and outputted as an add signal to the detection-signal extracting circuit 11. In the detection-signal extracting circuit 11, the add signal outputted from the add circuit 10 is outputted as a reproduced signal to the reproduced-data output circuit 12, and comparison-operated with the reference value and inputted as a tracking detection signal including a difference value and symbol to the tracking signal producer 13.

As described above, where reading out is made in the state that the microscopic aperture 84 of the reproducing probe 83 at its center is deviated from the center axis 81 of the read-out track on the information recording medium 80, a tracking signal representative of a moving direction and moving amount of the reproducing probe 83 is first produced and outputted in the tracking signal producer 13 from a difference value and symbol represented by the tracking detection signal. In the actuator 14, the reproducing probe is moved depending on the tracking signal outputted from the tracking signal producer 13 thereby achieving tracking control.

That is, in this tracking control, in the state that the reproducing probe 83 is deviated toward the outer diameter of the information recording medium 80 with respect to the read-out track, the reproducing probe 83 is moved toward the inner diameter of the information recording medium 80 up to the center axis of the read-out track. In the state that the reproducing probe 83 is deviated toward the inner diameter of the information recording medium 80 with respect to the read-out track, the reproducing probe 83 is moved toward the outer diameter of the information recording medium 80 up to the center axis of the read-out track.

Incidentally, in Embodiment 6 explained above, the data bits 82 are formed as grooves or marks (material having a property locally different in scatter ratio of near-field light e.g. different in refractive index from the surroundings) on the read-out track.

As explained above, according to the information recording medium according to Embodiment 6, because the microscopic aperture of the reproducing probe is made in a shape that the spacing in the read-out track is constantly increased in one direction, a tracking detection signal for tracking control can be obtained from a difference in intensity of near-field light interacting with the data bit in a position deviated from the center axis of the read-out track. From a comparison between the intensity of the tracking detection signal and the predetermined reference value, tracking control can be made for the reproducing probe. Also, because the near-field light produced in the microscopic aperture of the reproducing probe is utilized for a signal for tracking control, accurate tracking control is achieved with high positional resolving power. Furthermore, because the optical systems used in reproduced-signal detection and tracking-signal detection are integrated without separation, the apparatus structure can be simplified.

In Embodiments 1 to 6 explained above, although data was read out by making the information recording medium in a disk form and rotating it at high velocity, the information recording medium may be made in a planar plate instead of the disk form to read out data due to vector scan of the reproducing probe.

In Embodiments 1 to 3 and 5 to 6 explained above, explanation was made on the information recording medium and information reproducing apparatus for performing tracking control during information reproducing. However, also in the case of recording information to an information recording medium using phase-shift film, there is a need to conduct tracking control similarly to the case during information reproducing. In such a case, similarly to the shown in Embodiments 1 to 3 and 5 to 6 as above, it is needless to say that tracking control can be done by making asymmetric, with respect to a track direction, any of the arrangement or shape of servo data, track sectional form and aperture shape.

In Embodiment 1 to 3 explained above, explanation was made on the case that servo bits having asymmetry with respect to the track direction were alternately arranged on a center axis of the track. However, it is needless to say that they may be not necessarily alternate but satisfactorily arranged in a predetermined pattern.

In Embodiments 1 to 6 explained above, concerning asymmetry in the servo bits and data bits, track and aperture form, various forms such as trapezoid may be satisfactory only if having asymmetry with respect to a track direction besides triangular, stepwise and saw-tooth forms.

In Embodiments 1 to 6 explained above, although the electric signal from the photo-detectors 6 and 7 was amplified and added in the add circuit 10, the amplification and addition are not necessarily performed. For example, where the photo-detectors 6 and 7 are integral, addition is not required. Also, where the electric signal is high in S/N, there is no need to perform particular amplification. Furthermore, it is needless to say that the differential signal may be as a tracking detection signal.

INDUSTRIAL APPLICABILITY

As explained above, according to the first information recording medium, prepared as the servo data are a first groove formed having a depth increased constantly or gradually in one direction perpendicular to both a direction of the read-out track and a direction of a depth of the medium and a second groove made reverse in depth increase direction to the first groove, which are alternately arranged on the read-out track in the servo pattern zone. Accordingly, where near-field light is introduced to the read-out track of the servo data in a position deviated from a center thereof, it is possible to obtain reflection scattering light with repeating high and low intensities. This can be utilized as a signal for tracking control.

According to the second information recording medium of the present invention, the following is given in addition to the effect in the first information recording medium. Because the section of the servo data in a direction perpendicular to the read-out direction is made in a triangular form, it is possible to provide a slant surface for the servo data. Where introducing near-field light, it is possible to obtain reflection scattering light finely varying in the depth direction.

According to the third information recording medium of the present invention, the following is provided in addition to the effect in the first information recording medium. Because the section of the servo data in a direction perpendicular to the read-out direction is made in a stepwise form, it is possible to obtain reflection scattering light varying stepwise where near-field light is introduced to the servo data in each position in a direction away from a center thereof.

According to the fourth information recording medium of the present invention, because prepared as the servo data for tracking control are a first groove formed having an interval increased constantly or gradually in one direction perpendicular to both a direction of the read-out track and a direction of a depth of the medium and a second groove made reverse in interval increase direction to the first groove, which are alternately arranged on the read-out track in the servo pattern zone. Accordingly, where near-field light is introduced to the read-out track of the servo data in a position deviated from a center thereof, it is possible to obtain reflection scattering light with repeating high and low intensities. This can be utilized as a signal for tracking control.

According to the fifth information recording medium of the present invention, a unit of the information is constituted by a groove formed having a depth constantly or gradually increased in one direction perpendicular to both a direction of a read-out track to be read by the reproducing probe and a direction of a depth of the medium. Accordingly, when reading out the information, where near-field light is introduced from a center of this read-out track to each position perpendicular to the read-out track and in a plane direction of the medium, it is possible to obtain reflection scattering light different in intensity. This can be utilized as a signal for tracking.

Also, according to sixth information recording medium of the present invention, a section taken in a direction perpendicular to a read-out direction to be read by the reproducing probe is formed in the form of saw tooth, and each slant surface constituting the saw tooth is formed with the information as a read-out track. Accordingly, when reading out the information, where near-field light is introduced from a center of this read-out track to each position perpendicular to the read-out track and in a plane direction of the medium, it is possible to obtain reflection scattering light different in intensity. This can be utilized as a signal for tracking.

Also, according to the first information reproducing apparatus of the present invention, an information recording medium is provided with a reproduced-data zone recording reproduced data and a servo pattern zone recording servo data for tracking control. The servo data is arranged with a constant deviation alternately left and right with respect to a center axis of the read-out track. By making incident the near-field light produced in the microscopic aperture of the reproducing probe on the servo pattern zone, it is possible to obtain a tracking signal having a waveform different depending on a deviation from a center axis of the read-out track. Because the reproducing probe is controlled in position according to the tracking signal, accurate tracking control utilizing near-field light is made possible.

Also, according to the second information reproducing apparatus of the present invention, an information recording medium is provided with a reproduced-data zone recording reproduced data and a servo pattern zone recording servo data for tracking control. Prepared as the servo data are a first groove formed having a depth increased constantly or gradually in one direction perpendicular to both a direction of the read-out track and a direction of a depth of the medium and a second groove formed reverse in depth increasing direction to the first groove, which are alternately arranged on the read-out track in the servo pattern zone. By making incident the near-field light produced in the microscopic aperture of the reproducing probe on the servo pattern zone, it is possible to obtain a tracking detection signal having a waveform different depending on a deviation from a center axis of the read-out track. Because the reproducing probe is controlled in position according to the tracking detection signal, accurate tracking control utilizing near-field light is made possible.

According to the third information reproducing apparatus of the present invention, an information recording medium is provided with a reproduced-data zone recording reproduced data and a servo pattern zone recording servo data for tracking control. Prepared as the servo data are a first groove formed having an interval in a direction of the read-out track increased constantly or gradually in one direction perpendicular to both the direction of the read-out track and a direction of a depth of the medium and a second groove formed having an interval in the direction of the read-out track increased constantly or gradually in the other direction perpendicular to both the direction of the read-out track and the direction of the depth of the medium. These are alternately arranged on the read-out track in the servo pattern zone. By making incident the near-field light produced in the microscopic aperture of the reproducing probe on the servo pattern zone, it is possible to obtain a tracking signal having a waveform different depending on a deviation from a center axis of the read-out track. Because the reproducing probe is controlled in position according to the tracking detection signal, accurate tracking control utilizing near-field light is made possible.

According to the fourth information reproducing apparatus of the present invention, an information recording medium forms, as a unit of the information, a groove formed having a depth constantly or gradually increased in one direction perpendicular to both a direction of a read-out track to be read by the reproducing probe and a direction of a depth of the medium. Accordingly, when reading out the information, the intensity of the near-field light interacting with this information, i.e. a tracking detection signal detected in the photo-detector, varies in a position deviated from a center axis of the read-out track. Consequently, it is possible to control a position of the reproducing probe according to an intensity of the tracking detection signal and performing accurate tracking control utilizing near-field light.

According to the fifth information reproducing apparatus of the present invention, an information recording medium having a section taken in a direction perpendicular to a read-out direction to be read by the reproducing probe is formed in the form of saw tooth. The information is formed along a slant surface as a read-out track constituting the saw tooth. Accordingly, when reading out the information, the intensity of the near-field light interacting with this information, i.e. a tracking detection signal detected in the photo-detector, varies in a position deviated from a center axis of the read-out track. Consequently, it is possible to control a position of the reproducing probe according to an intensity of the tracking detection signal and performing accurate tracking control utilizing near-field light.

According to the sixth information reproducing apparatus of the present invention, a reproducing probe has microscopic apertures made in a form having an interval in a direction of the read-out track increased constantly in a direction of the read-out track. Accordingly, the intensity of the near-field light interacting with the information formed on the information recording medium, i.e. a tracking detection signal detected in the photo-detector, varies in a position deviated from a center axis of the read-out track. Consequently, it is possible to control a position of the reproducing probe according to an intensity of the tracking detection signal and performing accurate tracking control utilizing near-field light.

What is claimed is:

1. An information recording medium comprising: a read-out track having a data region forming data bits for reproduced data and a servo pattern region forming servo bits for tracking control, the servo bits having a first groove that is deep in a direction perpendicular to both a length of the read-out track and a depth of the information recording medium, and a second groove that is deep in a direction opposite to the first groove and having a depth gradually increasing along the read-out track.

2. An information recording medium as claimed in claim 1; wherein the first groove and the second groove are triangular in section taken in the direction perpendicular to the length of the read-out track.

3. An information recording medium as claimed in claim 1; wherein the first groove and the second groove have a stepped cross-section taken in the direction perpendicular to the length of the read-out track.

4. An information recording medium comprising: a read-out track having a data region forming data bits for reproduced data and a servo pattern region forming servo bits for tracking control, the servo bits having a first groove extending in a direction perpendicular to both a length of the read-out track and a depth of the information recording medium, and a second groove extending in a direction opposite to the first groove.

5. An information reproducing apparatus comprising:
an information recording medium having on a read-out track a data region forming data bits for reproduced data and a servo pattern region forming servo bits for tracking control, the servo bits being arranged with a constant deviation alternately left and right with respect to a center axis of the read-out track;
a reproducing probe for reading the read-out track, the reproducing probe having a microscopic aperture for producing near-field light and for directing the near-field light toward the read-out track during reading of the read-out track so that the near-field light is scattered by the servo bits formed in the servo pattern region of the read-out track;
photo-detecting means for detecting reflection scattering light generated as a result of the scattering of the near-field light by the servo data and for outputting a detection signal;
comparison operating means for comparing a detection signal outputted from the photo-detecting means with a synchronization signal determined in accordance with an interval of the servo bits and for generating and outputting a differential signal; and
reproducing-probe-position control means for controlling a position of the reproducing probe in accordance with a differential signal outputted by the comparison operating means.

6. An information reproducing apparatus comprising:
an information recording medium having on a read-out track a data region forming data bits for reproduced data and a servo pattern region forming servo bits for tracking control, the servo bits having a first groove that is deep in a direction perpendicular to both a length of the read-out track and a depth of the information recording medium, and a second groove that is deep in a direction opposite to the first groove and having a depth gradually increasing along the read-out track;
a reproducing probe for reading the read-out track, the reproducing probe having a microscopic aperture for producing near-field light and for directing the near-field light toward the read-out track during reading of the read-out track so that the near-field light is scattered by the servo bits formed in the servo region of the read-out track;
photo-detecting means for detecting reflection scattering light generated as a result of the scattering of the near-field light by the servo data and for outputting a detection signal;
comparison operating means for comparing a detection signal outputted from the photo-detecting means with a synchronization signal determined in accordance with an interval of the servo bits and for generating and outputting a differential signal; and
reproducing-probe-position control means for controlling a position of the reproducing probe in accordance with a differential signal outputted by the comparison operating means.

7. An information reproducing apparatus comprising:
an information recording medium having on a read-out track a data region forming data bits for reproduced data and a servo pattern region forming servo bits for tracking control, the servo bits having a first groove extending in a direction perpendicular to both a length of the read-out track and a depth of the information recording medium, and a second groove extending in a direction opposite to the first groove;
a reproducing probe for reading the read-out track, the reproducing probe having a microscopic aperture for producing near-field light and for directing the near-field light toward the read-out track during reading of the read-out track so that the near-field light is scattered by the servo bits formed in the servo region of the read-out track;
photo-detecting means for detecting reflection scattering light generated as a result of the scattering of the near-field light by the servo data and for outputting a detection signal;
comparison operating means for comparing a detection signal outputted from the photo-detecting means with a synchronization signal determined in accordance with an interval of the servo bits and for generating and outputting a differential signal; and reproducing-probe-position control means for controlling a position of the reproducing probe in accordance with a differential signal outputted by the comparison operating means.

8. An information reproducing apparatus comprising:

an information recording medium containing a unit of information comprised of a groove having a depth which increases constantly or gradually in a direction perpendicular to both a length of the read-out track and a depth of the information recording medium;

a reproducing probe for reading the read-out track, the reproducing probe having a microscopic aperture for producing near-field light and for directing the near-field light toward the read-out track during reading of the read-out track so that the near-field light is scattered by the servo bits formed in the servo region of the read-out track;

photo-detecting means for detecting reflection scattering light generated as a result of the scattering of the near-field light by the servo data and for outputting a detection signal; and reproducing-probe-position control means for controlling a position of the reproducing probe in accordance with an intensity of the detection signal outputted by the photo-detecting means.

9. An information reproducing apparatus comprising:

an information recording medium having a groove containing a unit of information, the groove being saw tooth-shaped in a section taken in a direction perpendicular to a read-out direction, the unit of information being formed along a slant surface of the saw tooth-shaped groove;

a reproducing probe for reading the read-out track, the reproducing probe having a microscopic aperture for producing near-field light and for directing the near-field light toward the read-out track during reading of the read-out track so that the near-field light is scattered by the servo bits formed in the servo region of the read-out track;

photo-detecting means for detecting reflection scattering light generated as a result of the scattering of the near-field light by the servo data and for outputting a detection signal; and reproducing-probe-position control means for controlling a position of the reproducing probe in accordance with an intensity of the detection signal outputted by the photo-detecting means.

10. An information reproducing apparatus comprising:

an information recording medium having a read-out track containing information;

a reproducing probe for reading the read-out track of the information recording medium, the reproducing probe having microscopic apertures for producing near-field light and for directing the near-field light toward the read-out track during reading of the read-out track so that the near-field light is scattered by the information contained in the read-out track, the microscopic apertures extending at an interval in a direction perpendicular to both a direction of the read-out track and a direction of a depth of the information recording medium;

photo-detecting means for detecting reflection scattering light generated as a result of the scattering of the near-field light by the information contained in the read-out track and for outputting a detection signal; and reproducing-probe-position control means for controlling a position of the reproducing probe in accordance with an intensity of the detection signal outputted by the photo-detecting means.

11. An information recording/reproducing apparatus comprising:

an information recording medium comprised of a read-out track having a slant surface and a unit of information formed along the slant surface, the read-out track being asymmetric about an axis extending in a direction generally perpendicular to a scanning direction of a probe for recording/reproducing the unit information of the read-out track;

a probe for recording/reproducing the unit of information of the read-out track of the information recording medium, the probe having a microscopic aperture for producing near-field light and for directing the near-field light toward the read-out track so that the near-field light is scattered by the unit of information of the read-out track;

photo-detecting means for detecting reflection scattering light generated as a result of the scattering of the near-field light and for outputting a detection signal; and probe-position control means for controlling a position of the probe in accordance with an intensity of the detection signal or a differential signal between the detection signal and a reference signal.

12. An information recording medium comprising: a read-out track having a servo pattern region; and a plurality of servo bits formed in the servo pattern region for tracking control, the servo bits having first grooves extending deep in a direction perpendicular to both a depth of the information recording medium and a length of the read-out track, and second grooves extending deep in a direction opposite to the first grooves and alternating with the first grooves.

13. An information recording medium according to claim 12; wherein each of the first grooves has a depth which gradually increases along the read-out track.

* * * * *